(12) United States Patent
Miroewski et al.

(10) Patent No.: US 8,794,643 B2
(45) Date of Patent: Aug. 5, 2014

(54) TOY VEHICLE

(75) Inventors: Michael Miroewski, Aurora, OH (US); Anthony S. Zuccaro, Chesterland, OH (US); Donald R. Wright, Uniontown, OH (US); Robert A. Frindt, Chardon, OH (US); Dale Anton Panasewicz, Strongsville, OH (US)

(73) Assignee: The Step2 Company, LLC, Streetsboro, OH (US)

( * ) Notice: Subject to any disclaimer, the term of this patent is extended or adjusted under 35 U.S.C. 154(b) by 50 days.

(21) Appl. No.: 13/463,032

(22) Filed: May 3, 2012

(65) Prior Publication Data

US 2012/0286487 A1  Nov. 15, 2012

Related U.S. Application Data

(60) Provisional application No. 61/484,744, filed on May 11, 2011.

(51) Int. Cl.
*B62B 7/04* (2006.01)
*A63H 17/26* (2006.01)

(52) U.S. Cl.
CPC .................................. *A63H 17/262* (2013.01)
USPC ...................................................... 280/47.11

(58) Field of Classification Search
CPC ..... A63H 17/00; A63H 17/262; B62K 21/005
USPC ................... 280/81.5, 47.11, 7.17, 7.1, 87.02, 280/87.01, 87.05, 89.272, 755, 270, 282, 280/304.5
See application file for complete search history.

(56) References Cited

U.S. PATENT DOCUMENTS

| | | | |
|---|---|---|---|
| 1,094,749 A | | 4/1914 | Sadtler |
| 4,261,588 A | * | 4/1981 | Kassai ........................ 280/7.17 |
| 4,392,541 A | * | 7/1983 | Barchard ..................... 180/209 |
| 5,884,922 A | | 3/1999 | Pickering |
| 6,725,956 B1 | | 4/2004 | Lemire |
| 2002/0000702 A1 | | 1/2002 | Charron |
| 2002/0094744 A1 | | 7/2002 | Cheng |
| 2003/0061681 A1 | | 4/2003 | Plate |
| 2010/0013172 A1 | | 1/2010 | Goertzen et al. |

FOREIGN PATENT DOCUMENTS

EP   1616718 A2   1/2006

OTHER PUBLICATIONS

International Search Report and Written Opinion of the International Search Authority for International Application Serial No. PCT/US2012/36472, dated Jul. 18, 2012, 14 pages, in its entirety.

* cited by examiner

*Primary Examiner* — J. Allen Shriver, II
*Assistant Examiner* — Brian Cassidy
(74) *Attorney, Agent, or Firm* — Ulmer & Berne LLP

(57) ABSTRACT

A toy vehicle includes a body and a left front wheel, a right front wheel, a left rear wheel, and a right rear wheel, with each of these wheels being coupled with the body and rotatable relative to the body. The toy vehicle also includes a caster assembly that includes a swivel-type caster. The swivel-type caster is coupled with the body and includes at least one rotatable wheel. The swivel-type caster is swivelable relative to the body and is movable vertically relative to the body between a raised position and a lowered position.

19 Claims, 15 Drawing Sheets

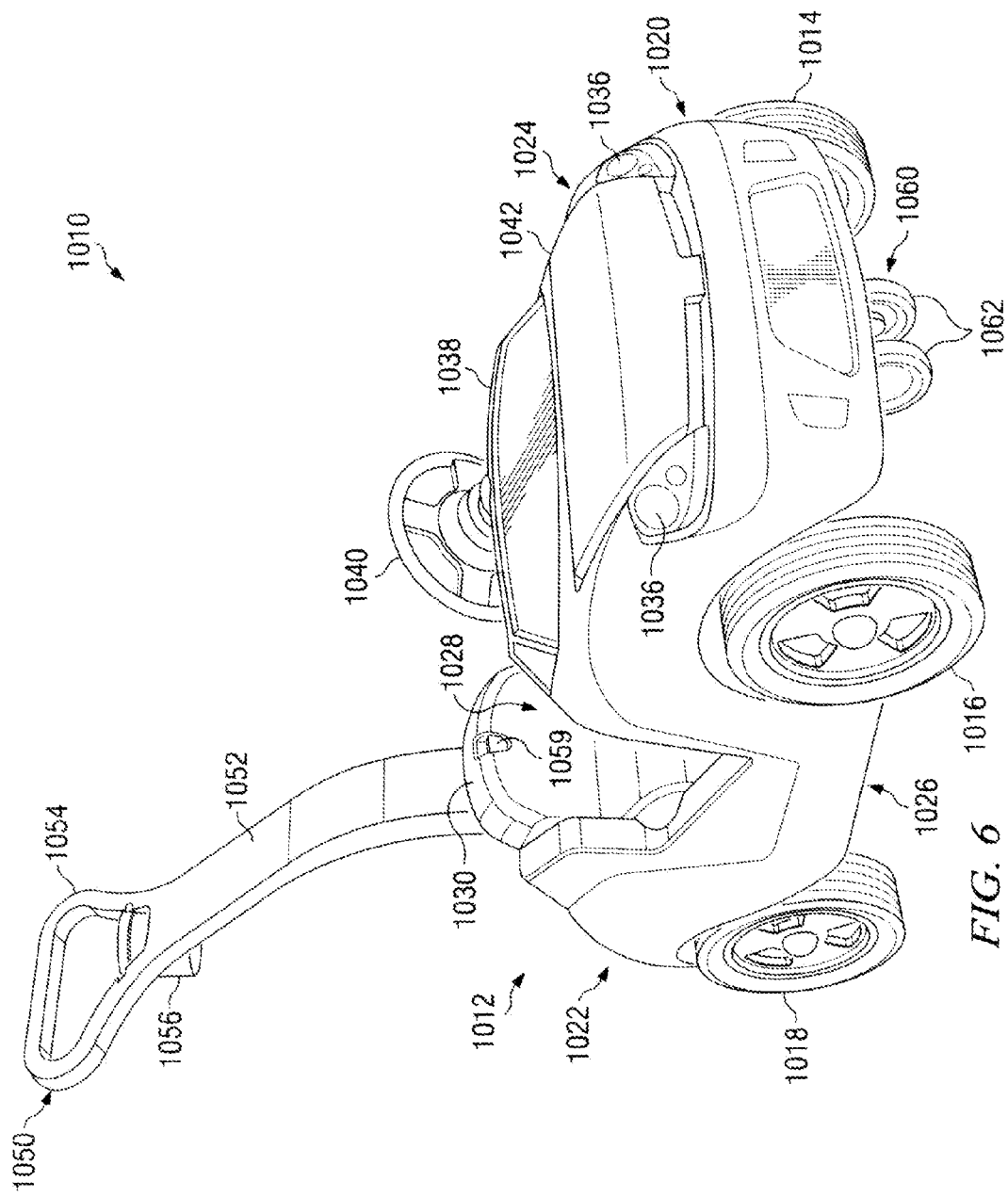

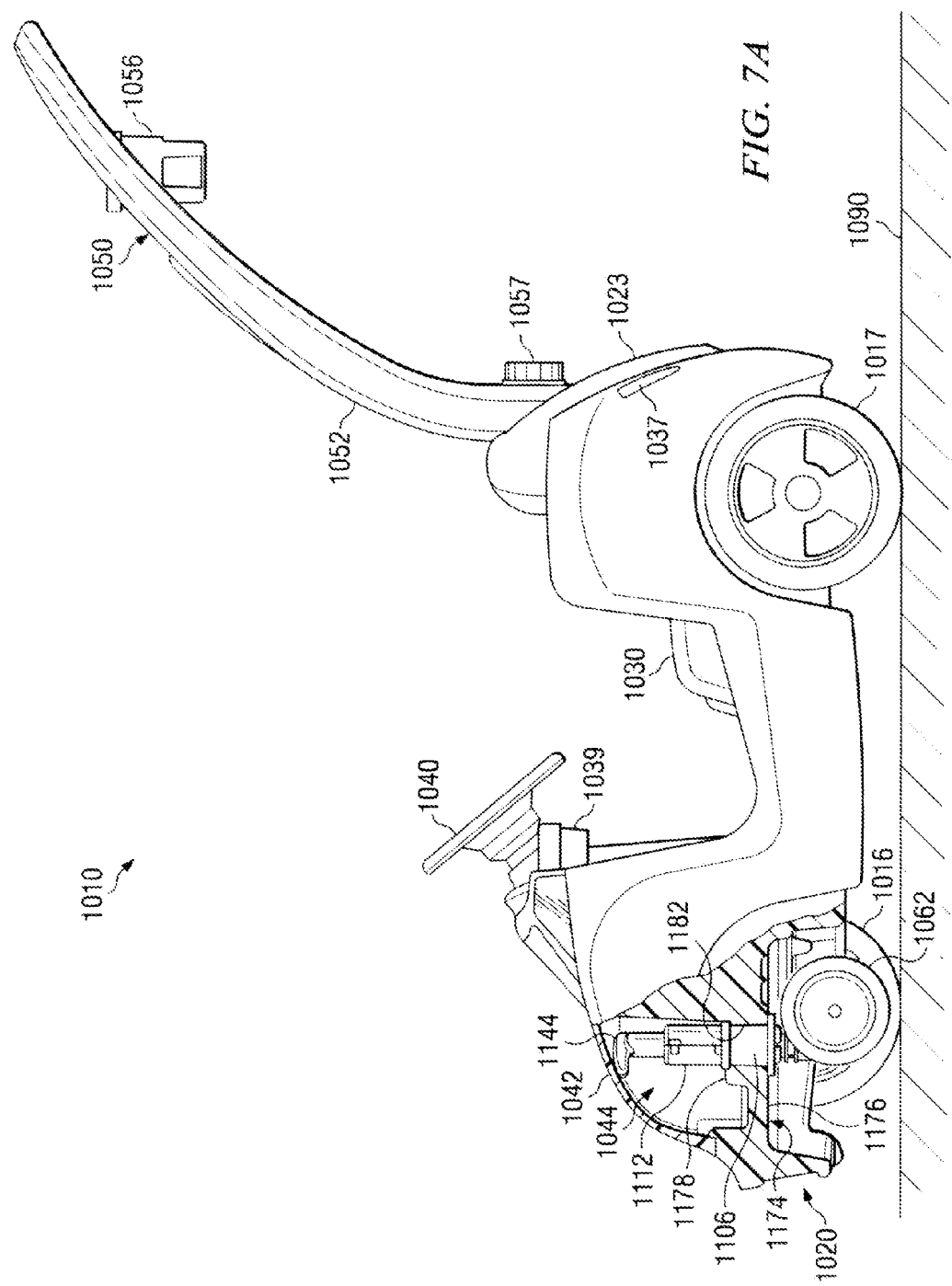

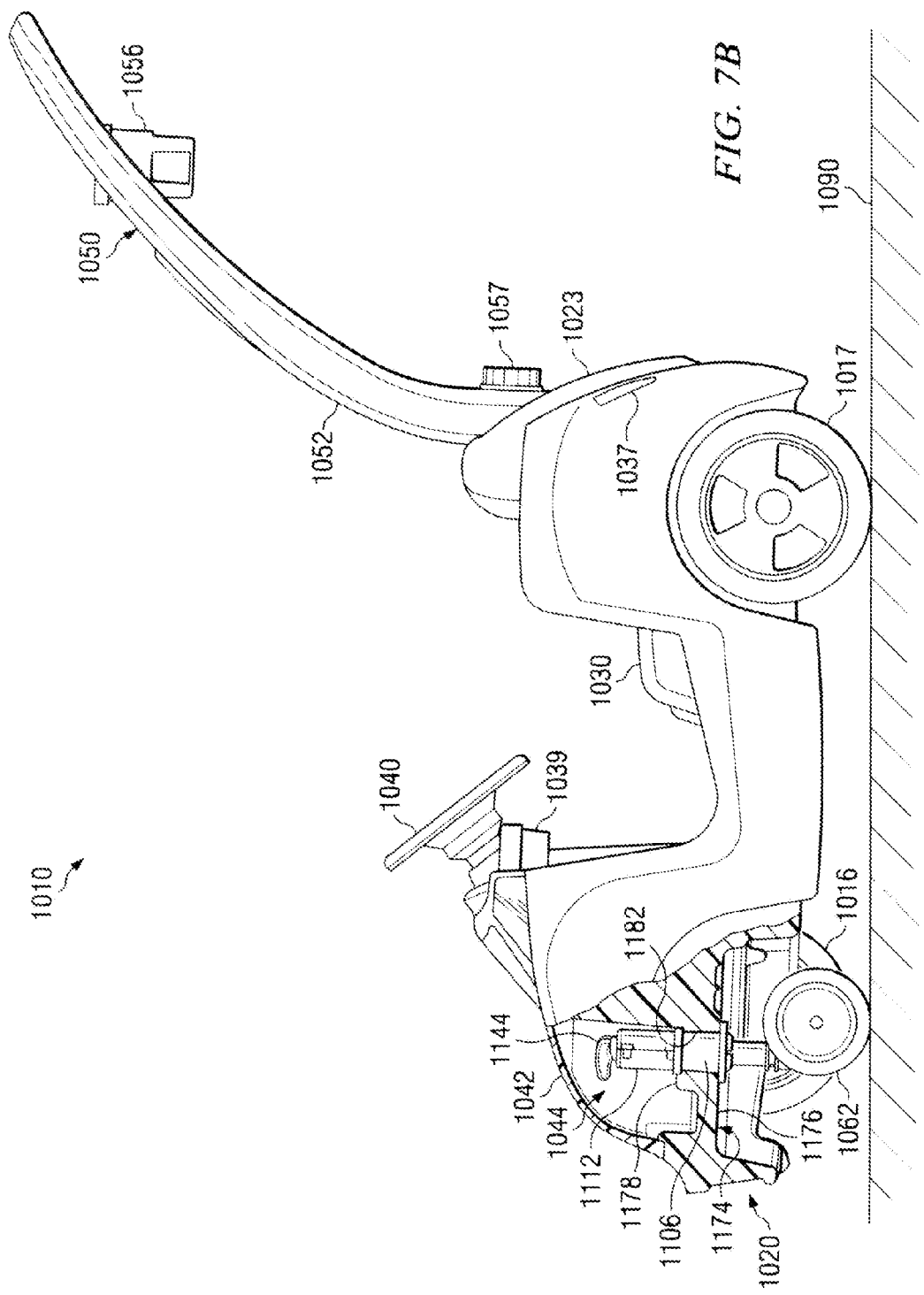

TOY VEHICLE

CROSS REFERENCE TO RELATED APPLICATION

This application claims the priority benefit of U.S. Provisional Patent Application Ser. No. 61/484,744, "Toy Vehicle", filed May 11, 2011, which is hereby expressly incorporated by reference herein in its entirety.

TECHNICAL FIELD

This application relates generally to toy vehicles, and more particularly to toy vehicles that include a swivel-type caster.

BACKGROUND

Various devices are known that facilitate the transportation of children by a caretaker for various reasons, such as a casual walk or to facilitate a shopping outing by the caretaker. Such devices can include those that are configured to resemble a toy vehicle, such as an automobile, and that can be configured to facilitate pushing and/or pulling the toy vehicle by the caretaker.

SUMMARY

A toy vehicle according to one embodiment includes a body and a left front wheel and a right front wheel. Each of the left front wheel and the right front wheel is coupled with the body and rotatable relative to the body. The toy vehicle further includes a left rear wheel and a right rear wheel. Each of the left rear wheel and the right rear wheel is coupled with the body and rotatable relative to the body. The toy vehicle also includes a caster assembly that includes a swivel-type caster. The swivel-type caster is coupled with the body and includes at least one rotatable wheel. The swivel-type caster is swivelable relative to the body and is movable vertically relative to the body between a raised position and a lowered position.

A toy vehicle according to another embodiment includes a body that includes a front end portion and a rear end portion. The toy vehicle also includes a left front wheel, a right front wheel, a left rear wheel and a right rear wheel, each of which is coupled with the body and rotatable relative to the body. The toy vehicle further includes a caster assembly that includes a swivel-type caster coupled with the front end portion of the body such that the swivel-type caster is swivelable relative to the body and is movable vertically relative to the body between a raised position and a lowered position. The swivel-type caster includes at least one rotatable wheel. The toy vehicle also includes a handle coupled with the rear end portion of the body. The front end portion of the body defines an interior compartment, and a portion of the caster assembly is positioned within the interior compartment to facilitate access to the caster assembly. When the swivel-type caster is in the raised position, each of the left front wheel, the right front wheel, the left rear wheel and the right rear wheel is configured to rest upon a flat support surface such that the at least one rotatable wheel of the swivel-type caster is spaced from the flat support surface. When the swivel-type caster is in the lowered position, the at least one rotatable wheel of the swivel-type caster and each of the left rear wheel and the right rear wheel are configured to rest upon the flat support surface such that each of the left front wheel and the right front wheel is spaced from the flat support surface.

A toy vehicle according to another embodiment includes a body that includes a front end portion and a rear end portion. The toy vehicle also includes a left front wheel and a right front wheel, a left rear wheel and a right rear wheel, each being coupled with the body and rotatable relative to the body. The toy vehicle further includes a caster assembly that includes a swivel-type caster and an actuator assembly. The swivel-type caster includes at least one rotatable wheel. The actuator assembly includes a guide and a plunger. The guide is secured to the front end portion of the body and defines a passage. The plunger is movable vertically within the passage relative to the guide and the front end portion of the body. The swivel-type caster includes at least one rotatable wheel. The plunger is coupled with the swivel-type caster such that the swivel-type caster is swivelable relative to the body and is movable vertically with the plunger relative to the front end portion of the body between a raised position and a lowered position.

BRIEF DESCRIPTION OF THE DRAWINGS

It is believed that certain embodiments will be better understood from the following description taken in conjunction with the accompanying drawings in which:

FIG. 6 is a right, front perspective view depicting a toy vehicle including a caster assembly according to another embodiment;

FIG. 7A is a left side elevational view of the toy vehicle of FIG. 6, shown partially in a cross-section, with a swivel-type caster of the caster assembly being depicted in a raised position;

FIG. 7B is a left side elevational view similar to FIG. 7A, but with the swivel-type caster being depicted in a lowered position;

DETAILED DESCRIPTION

Figure 1:
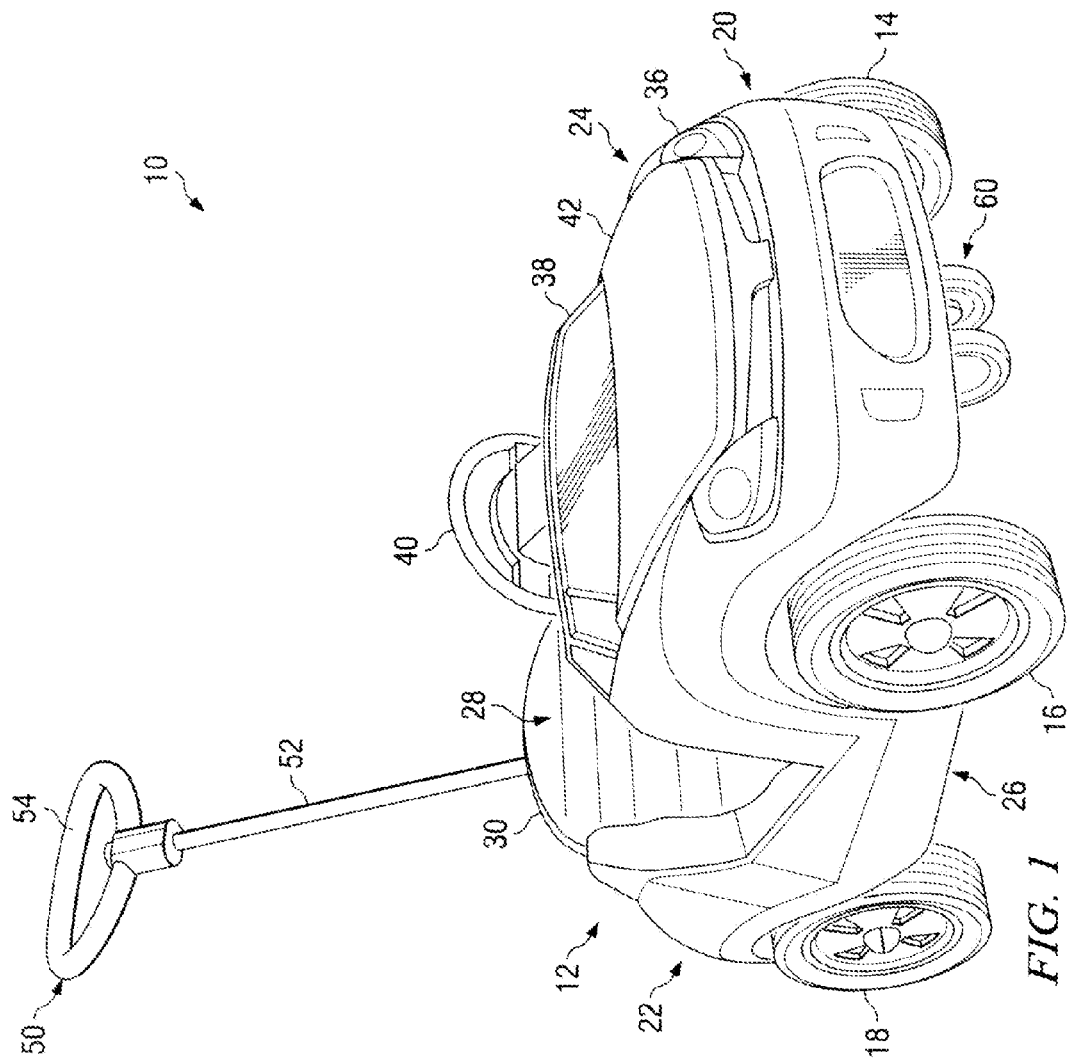
FIG. 1 is a right, front perspective view of a toy vehicle according to one embodiment, with the toy vehicle including a caster assembly according to one embodiment.
Figure 2A:
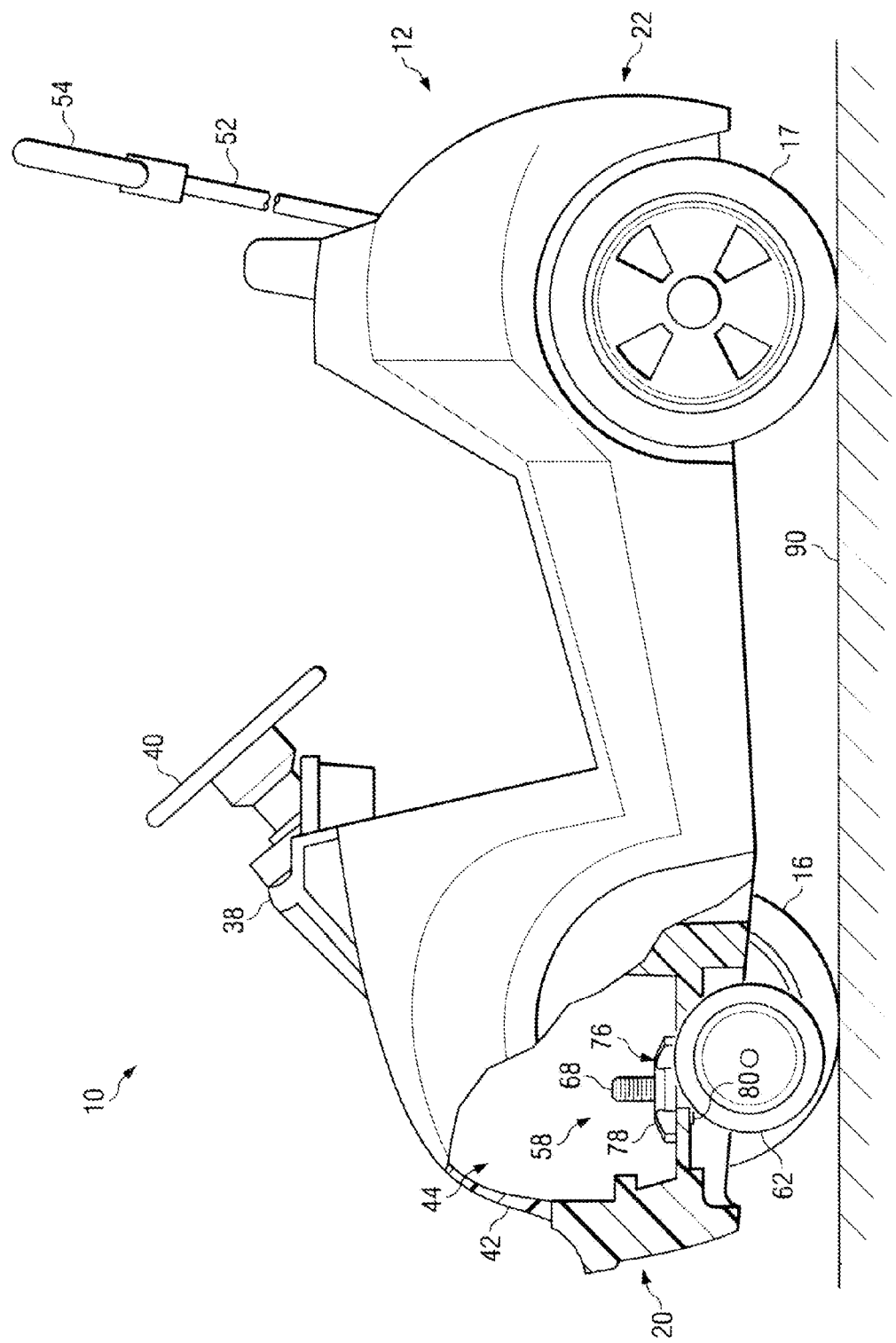
FIG. 2A is a left side elevational view of the toy vehicle of FIG. 1, shown partially in cross-section, with a swivel-type caster of the caster assembly being depicted in a raised position.
Figure 2B:
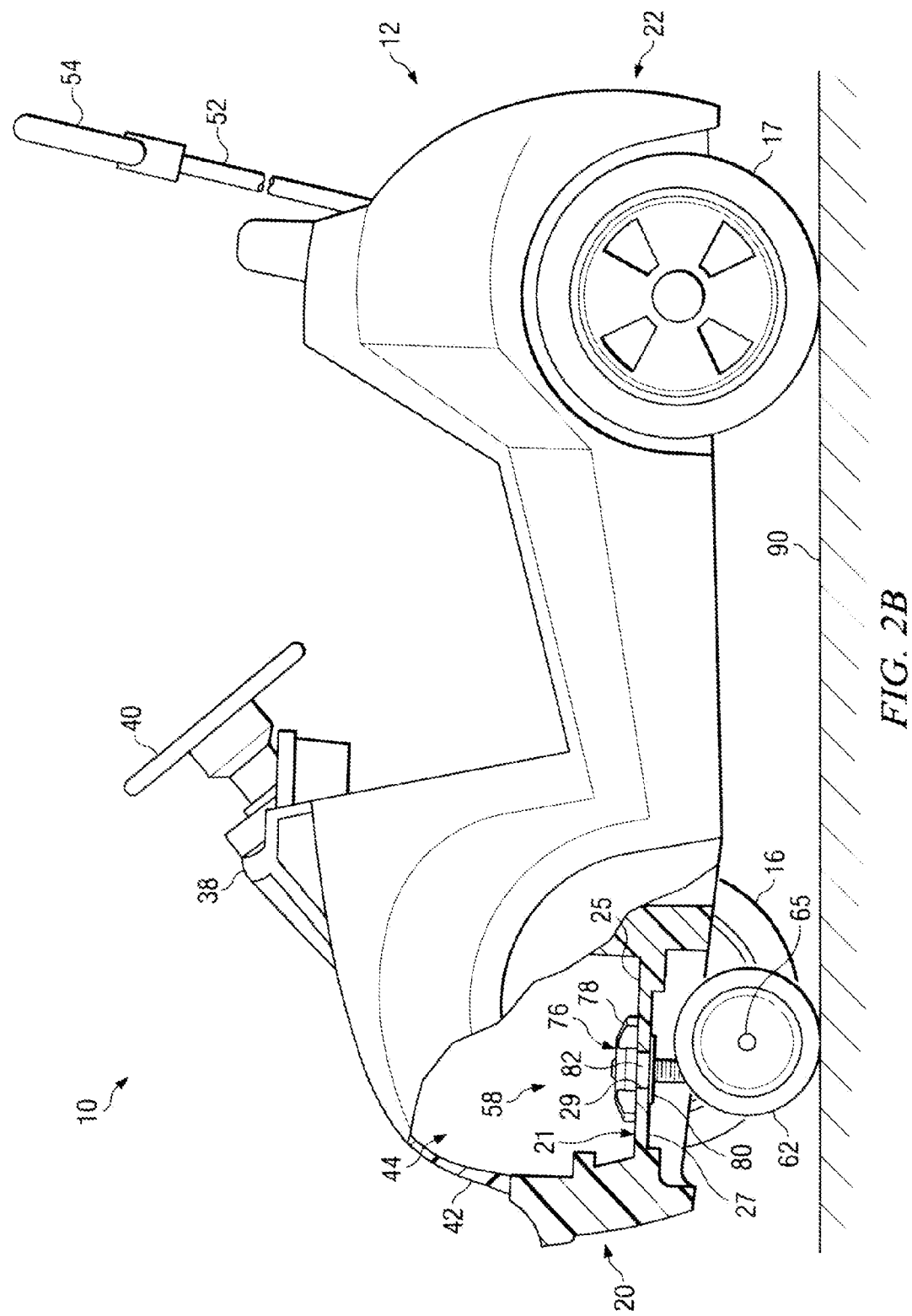
FIG. 2B is a left side elevational view similar to FIG. 2A, but with the swivel-type caster of the caster assembly being depicted in a lowered position.
Figure 3:
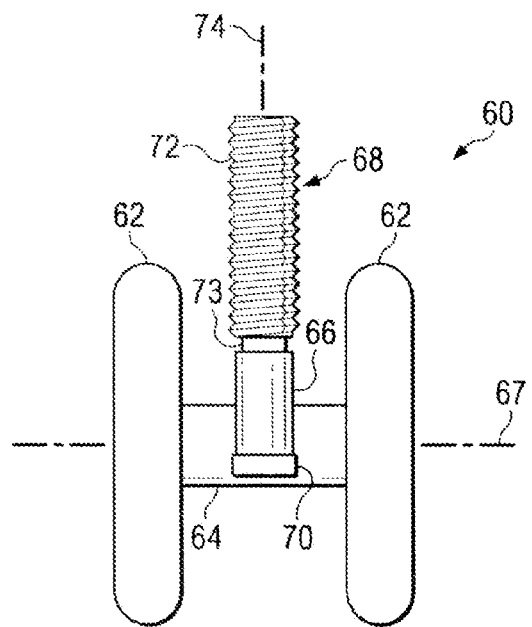
FIG. 3 is a front elevational view depicting a portion of the swivel-type caster assembly of the vehicle of FIG. 1.

FIGS. 1-3 illustrate a toy vehicle 10 according to one embodiment. The toy vehicle 10 can be configured to resemble an automobile, and can be configured to facilitate pushing the toy vehicle 10 by a caretaker. The toy vehicle 10 can include a body 12, a left front wheel 14 coupled with the body 12, a right front wheel 16 coupled with the body 12, a left rear wheel 17 (FIGS. 2A and 2B) coupled with the body 12, and a right rear wheel 18 (FIG. 1) coupled with the body 12. In the embodiment depicted in FIGS. 1-3, the left front wheel 14, the right front wheel 16, the left rear wheel 17, and the right rear wheel 18 are coupled with the body 12 such that they are rotatable relative to the body 12, but are incapable of swiveling relative to the body 12. An axis of rotation of the left front wheel 14 can be coincident with an axis of rotation of the right front wheel 16, and an axis of rotation of the left rear wheel 17 can be coincident with an axis of rotation of the right rear wheel 18.

The body 12 can include a front end portion 20, a rear end portion 22, a left side 24 and a right side 26. The body 12 can define a passenger compartment 28 and can include a seat 30 that can be configured to support a relatively small child within the passenger compartment 28. The body 12 can be formed from any suitable plastic material and can be formed as a unitary structure. The body 12 can be formed using a roto-molding, injection molding, or blow molding process. The toy vehicle 10 can also include a pair of decorative headlights 36 that can be secured (or applied as a decal or sticker) to the body 12, or formed integrally with the body 12. The toy vehicle 10 can further include a windshield 38 and a dashboard that can be secured (or applied as a decal or sticker) to the body 12, or formed integrally with the body 12, and a steering wheel 40 that can be coupled with the dashboard. In one embodiment, the steering wheel 40 can be fixed to the dashboard such that the steering wheel 40 is stationary. In another embodiment, the steering wheel 40 can be rotatably coupled with the dashboard. In either embodiment, the steering wheel 40 can be uncoupled with the left front wheel 14 and the right front wheel 16, since they are incapable of swiveling relative to body 12 and are therefore not steerable.

The toy vehicle 10 can include a hood 42 that can be hingedly or otherwise movably coupled with the body 12, such that the hood 42 is movable between a closed position (FIGS. 1, 2A and 2B) and an opened position (not shown). The hood 42 can be opened to provide access to an interior compartment 44 (FIGS. 2A-2B). A rear handle 50 can be coupled with the body 12 and can be configured to facilitate pushing the toy vehicle 10 by a caretaker. The rear handle 50 can include an elongate portion 52 and a grasping portion 54 secured to the elongate portion 52. In one embodiment, the elongate portion 52 can be pivotally coupled with the body 12. In one embodiment, the elongate portion 52 can include two or more tubular members that are telescopically engaged with one another. In the embodiment of FIGS. 1-3, the grasping portion 54 can be attached, by any suitable means, to the elongate portion 52. In other embodiments, a handle can be provided that includes elongate and grasping portions that are integrally formed with one another as a unitary structure. In still other embodiments, toy vehicles can be provided with a front handle coupled with a front end portion of the respective vehicle.

The toy vehicle 10 can also include a caster assembly 58, which can include a swivel-type caster 60 (FIG. 3). In the embodiment of FIGS. 1-3, the swivel-type caster 60 can be coupled with the body 12, and can swivel relative to body 12. A body can comprise a unibody type structure as shown in FIGS. 1-3 with regard to body 12, but it will be appreciated that a body can alternatively include several different components attached together, such as body panels and a frame. In such embodiments, a swivel-type caster (e.g., 60) can be coupled with the body and/or the frame of the toy vehicle, such that the swivel-type caster (e.g., 60) can swivel relative to each of the body and the frame.

Figure 5:
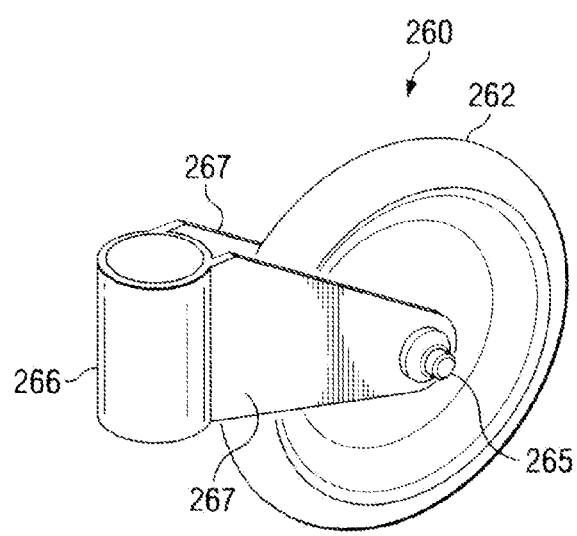
FIG. 5 is a perspective view depicting a swivel-type caster according to another embodiment.
Figure 4:
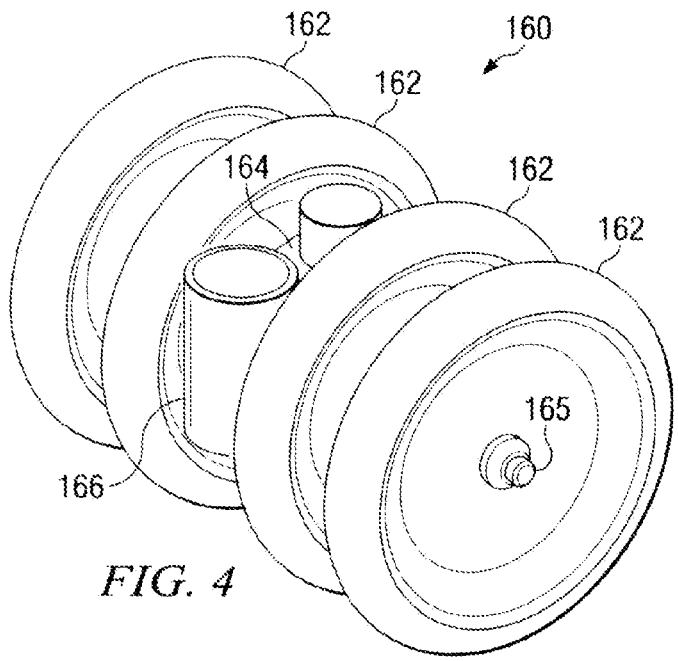
FIG. 4 is a perspective view depicting a swivel-type caster according to another embodiment.

The swivel-type caster 60 can include a pair of rotatable wheels 62, as shown in the embodiment of FIGS. 1-3. However, swivel-type casters can be provided that include a single rotatable wheel, for example as shown in FIG. 5, or more than two rotatable wheels, for example as shown in FIG. 4. In one embodiment, an outside diameter of each of the rotatable wheels 62 of caster 60 can be about 3 inches (7.62 cm) to about 6 inches (15.24 cm), or in one example about 4.25 inches (10.80 cm), and an outside diameter of each of the left front wheel 14, the right front wheel 16, the left rear wheel 17 and the right rear wheel 18 can be about 6 inches (15.24 cm) to about 10 inches (25.4 cm), or in one example about 8 inches (20.32 cm). The swivel-type caster 60 can also include a cross-member 64, with each of the rotatable wheels 62 rotatably coupled with the cross-member 64, for example with an axle 65 (FIG. 2B). Each of the rotatable wheels 62 can rotate about a generally horizontal axis 67 (FIG. 3) that extends through the axle 65.

The swivel-type caster 60 can also include a bushing 66. The caster assembly 58 can also include a rod 68, and a cap 70. The bushing 66 can be secured to the cross-member 64. In one embodiment, the cross-member 64 can be integrally formed with the bushing 66 as a unitary structure. The rod 68 can include an upper, threaded portion 72 and a lower portion 73 that can be non-threaded or smooth and received within the bushing 66. The cap 70 can be secured to or integrally formed with the lower portion 73 of rod 68, and can include an outside diameter that is greater than an inside diameter of a hollow interior (not shown) of the bushing 66. The lower portion 73 of rod 68 can be rotatable within the bushing 66, such that the lower portion 73 of rod 68 and bushing 66 can cooperate with one another to permit the swivel-type caster 60 to swivel relative to body 12 about a generally vertical axis 74 that extends through rod 68.

The caster assembly 58 can also include a knob 76 (FIGS. 2A and 2B). The knob 76 can cooperate with rod 68 to couple the swivel-type caster 60 with the body 12 of toy vehicle 10, and to establish the vertical position of the rotatable wheels 62 of the swivel-type caster 60 with respect to body 12. The knob 76 can include an upper grasping portion 78 which can include a knurled periphery to facilitate grasping the knob 76, and can further include a lower, annular flange 80 and a generally cylindrical portion 82 extending between the upper grasping portion 78 and the lower, annular flange 80. The generally cylindrical portion 82 can include internal threads, which can be configured to threadedly engage the upper, threaded portion 72 of rod 68. The front end portion 20 of the body 12 can include a lower mount structure 21, which can include an upper surface 25 and a lower surface 27, and can define an aperture 29. The aperture 29 can extend vertically through the lower mount structure 21, opening onto each of the upper surface 25 and the lower surface 27 of the lower mount structure 21. The generally cylindrical portion 82 can extend through the aperture 29 defined by the front end portion 20 of the body 12, as shown in FIGS. 2A and 2B. In one embodiment, the lower, annular flange 80 of knob 76 can be received within a recess (not shown) defined by the body 12, to restrain the knob 76 from moving upward relative to the body 12. In one embodiment, the knob 76 can be formed as a two-piece construction to facilitate assembly with the body 12. The knob 76 can include one or more detents (not shown) that can frictionally engage a recess, or recesses, defined by the body 12 to at least inhibit inadvertent rotation of the knob 76.

The swivel-type caster 60 can be moved vertically by rotating the knob 76. The swivel-type caster 60 can be raised by rotating knob 76 in a first direction, and can be lowered by rotating the knob 76 in a second, opposite direction. The cap 70 can facilitate raising the swivel-type caster 60 by exerting an upward force on the bushing 66 when the knob 76 is rotated in the first direction. At least the upper grasping portion 78 of the knob 76 can be positioned within the interior cavity 44 to permit access to the upper grasping portion 78 of the knob 76 when the hood 42 of the toy vehicle 10 is opened. In other embodiments, caster assemblies can have different configurations that can permit the respective, included swivel-type casters to be raised and lowered in any other suitable manner with respect to the toy vehicle to which they are coupled.

FIG. 2A depicts the swivel-type caster 60 in a raised position, with the wheels 62 of the swivel-type caster 60 being spaced from a flat support surface 90, such as a ground surface or a flat concrete walkway that is planar, upon which the left front-wheel 14, the right front-wheel 16, the left rear wheel 17 and the right rear wheel 18 rest. As noted above, in the embodiment of FIGS. 1-3, the left front wheel 14, the right front wheel 16, the left rear wheel 17, and the right rear wheel 18 are rotatable with respect to body 12, which facilitates movement of the toy vehicle 10 when the swivel-type caster 60 is in the raised position. FIG. 2B depicts the swivel-type caster 60 in a lowered position, with the rotatable wheels 62 of the swivel-type caster 60 resting upon, or in contacting engagement with, the flat support surface 90. When the swivel-type caster 60 is in the lowered position, the left front wheel 14 (not shown in FIGS. 2A and 2B) and the right front wheel 16 can be spaced from the flat support surface 90, as depicted in FIG. 2B with respect to the right front wheel 16, and the left rear wheel 17 and the right rear wheel 18 can rest upon, or be in contacting engagement with, the flat support surface 90. The upper, grasping portion 78 of the knob 76 can be in contacting engagement with the upper surface 25 of the lower mount structure 21 of the front end portion 20 of body 12 when the swivel-type caster 60 is in each of the raised position shown in FIG. 2A and the lowered position shown in FIG. 2B.

The swivel-type caster 60 can be positioned laterally intermediate the left front wheel 14 and the right front wheel 16. In one embodiment, the swivel-type caster 60 can be positioned laterally midway between the left front wheel 14 and the right front wheel 16. In the embodiment of FIGS. 1-3, the swivel-type caster 60 can be positioned longitudinally such that the swivel-type caster 60 is coupled with the front end portion 20 of the body 12. In other embodiments, a swivel-type caster (e.g., 60) can be coupled with a rear end portion (e.g., 22) of a body of a toy vehicle (e.g., 10). In either configuration, i.e. when a swivel-type caster is coupled with a front end portion or a rear end portion of a body of a toy vehicle, the respective toy vehicle can include a rear handle to facilitate pushing the respective toy vehicle and/or a front handle to facilitate towing or pulling the respective toy vehicle. In one embodiment, the swivel-type caster 60 can be positioned longitudinally such that, when the wheels 62 of the swivel-type caster 60 are generally parallel with the left front wheel 14 and the right front wheel 16, the axis of rotation (not shown) of the left front wheel 14 and the right front wheel 16 can be coincident with the axis of rotation 67 of the rotatable wheels 62. In other embodiments, the swivel-type caster 60 can be positioned longitudinally such that the axis of rotation 67 of the rotatable wheels 62 is either forward, or rearward, of the axis of rotation of the left front wheel 14 and the right front wheel 16.

In other embodiments, a swivel-type caster can be coupled with a toy vehicle such that the swivel-type caster is not moveable vertically and the rotatable wheels of the swivel-type caster remain in contacting engagement with a flat support surface. In such embodiments, the longitudinally adjacent ones of the front and rear wheels of the toy vehicle can be spaced from the flat support surface and may or may not be rotatable.

FIG. 4 depicts a swivel-type caster 160 according to another embodiment. The swivel-type caster 160 can be used on any of a variety of suitable toy vehicles. For example, the swivel-type caster 160 can be used in lieu of the swivel-type caster 60 of the caster assembly 58 of the toy vehicle 10. The swivel-type caster 160 can be similar to the swivel-type caster 60, but can include four rotatable wheels 162, instead of the two rotatable wheels 62 of the swivel-type caster 60. The swivel-type caster 160 can also include an axle 165, supporting each of the rotatable wheels 162 and can include a bushing 166, which can be secured to a cross-member 164. The axle 165 can extend through the cross-member 164. Each of the rotatable wheels 162 can be rotatable about a horizontal axis (not shown) extending through the axle 165.

FIG. 5 depicts a swivel-type caster 260 according to another embodiment. The swivel-type caster 260 can be used on any of a variety of suitable toy vehicles. For example, the swivel-type caster 260 can be used in lieu of the swivel-type caster 60 of the caster assembly 58 of the toy vehicle 10. The swivel-type caster 260 can differ from the swivel-type caster 60 in the following regards. Instead of a pair of rotatable wheels, the swivel-type caster 260 can include a single rotatable wheel 262, which can be supported by an axle 265. The rotatable wheel 262 can be rotatable about a horizontal axis (not shown) that extends through the axle 265. The swivel-type caster 260 can also include a pair of brackets 267 that can be coupled with the axle 265 and a bushing 266.

FIG. 6 depicts a toy vehicle 1010 according to another embodiment. The toy vehicle 1010 can include a body 1012, a left front wheel 1014, a right front wheel 1016, a left rear wheel 1017 (FIGS. 7A and 7B), and a right rear wheel 1018. Each of the left front wheel 1014, the right front wheel 1016, the left rear wheel 1017, and the right rear wheel 1018 can be coupled with the body 1012 such that it is rotatable relative to the body 1012 but is incapable of swiveling relative to the body 1012. An axis of rotation of the left front wheel 1014 can be coincident with an axis of rotation of the right front wheel 1016, and an axis of rotation of the left rear wheel 1017 can be coincident with an axis of rotation of the right rear wheel 1018.

The body 1012 can include a front-end portion 1020, a rear-end portion 1022, a left side 1024 and a right side 1026. The body 1012 can define a passenger compartment 1028 and can include a seat 1030 that can be configured to support a relatively small child within the passenger compartment 1028. The body 1012 can be formed from any suitable plastic material and can be formed as a unitary structure. The body 1012 can be formed using a roto-molding, injection molding, or blow-molding process. The toy vehicle 1010 can also include a pair of decorative headlights 1036 that can be secured (or applied as a decal or sticker) to the body 1012 or formed integrally with the body 1012. The toy vehicle 1010 can also include a pair of decorative taillights 1037 (FIGS. 7A and 7B) that can be secured (or applied as a decal or sticker) to the body 1012 or formed integrally with the body 1012. The toy vehicle 1010 can further include a windshield 1038 that can be integral with or secured to the body 1012. The toy vehicle 1010 can also include a dashboard, which can be integral with or secured to the windshield 1038. The dashboard can include a cup holder 1039 (FIGS. 7A and 7B), which can be configured to receive a beverage container. The toy vehicle 1010 can also include a steering wheel 1040, which can be coupled with the dashboard. In one embodiment, the steering wheel 1040 can be fixed to the dashboard such that the steering wheel 1040 is stationary. In another embodiment, the steering wheel 1040 can be rotatably coupled with the dashboard. However, in either embodiment, the steering wheel 1040 can be uncoupled with the left front wheel 1014 and the right front wheel 1016, which can be incapable of swiveling relative to body 1012 such that they are not steerable.

Figure 13:
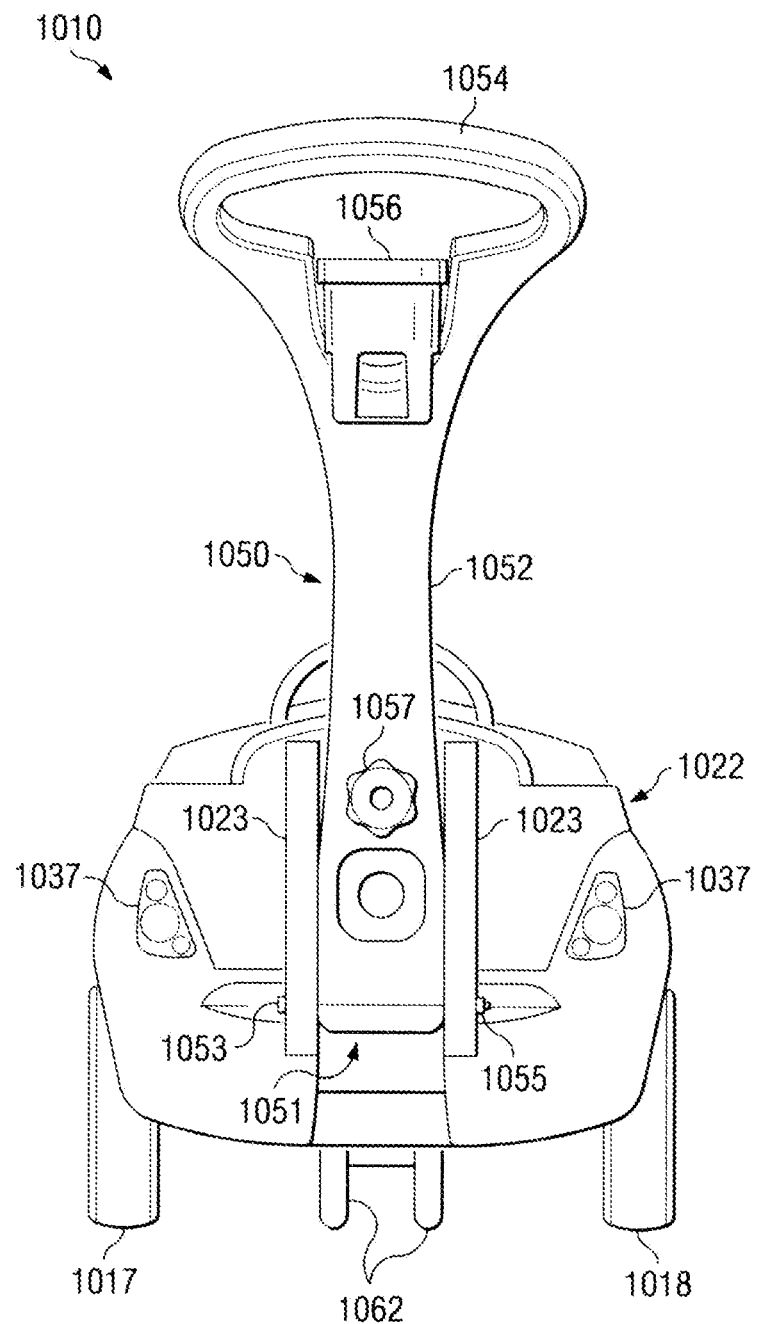
FIG. 13 is a rear elevational view of the toy vehicle of FIG. 6.

The toy vehicle 1010 can include a hood 1042 that can be hingedly or otherwise movably coupled with the body 1012, such that the hood 1042 can be opened to provide access to an interior compartment 1044, which can be defined by the front end portion 1020 of body 1012. A rear handle 1050 can be coupled with the rear end portion 1022 of body 1012, as shown in FIG. 13, and can be configured to facilitate pushing the toy vehicle by a caretaker. The rear handle 1050 can include an elongate portion 1052 and a grasping portion 1054, which can be integrally formed with the elongate portion 1052. The handle 1050 can include a cup holder 1056, which can be coupled with the elongate portion 1052 and can be positioned adjacent the grasping portion 1054. The cup holder 1056 can be configured to receive a beverage container.

A proximal end 1051 of the handle 1050 can be coupled with the rear end portion 1022 of body 1012, for example as shown in FIG. 13. The rear end portion 1022 of body 1012 can include a pair of ribs 1023, which can be spaced laterally from one another. As shown in FIG. 13, a portion of the elongate portion 1052 of handle 1050 can be positioned between the ribs 1023. A pin 1053 can extend through a first one of the ribs 1023, through the distal end 1051 of the handle 1050, and through the other one of the ribs 1023. The pin 1053 can include a threaded end, and can be secured with a female fastener such as nut 1055, as shown in FIG. 13. The elongate portion of 1052 of handle 1050 can also be fastened to the seat 1030. For example, in one embodiment, the toy vehicle 1010 can include a rotatable knob 1057, which can contact a rear surface of the elongate portion 1052. The rotatable knob 1057 can include a protruding portion (not shown) extending at least partially through a thickness of the elongate portion 1052, and which can define a plurality of female threads. The toy vehicle can also include an attachment member 1059 (FIG. 6) which can include a male fastener (not shown) that can extend rearwardly through the seat 1030. The rotatable knob 1057 can be threaded onto the male fastener of the attachment member 1059 to maintain the handle 1050 in an upright position as shown in FIG. 13 for example.

Figure 8:
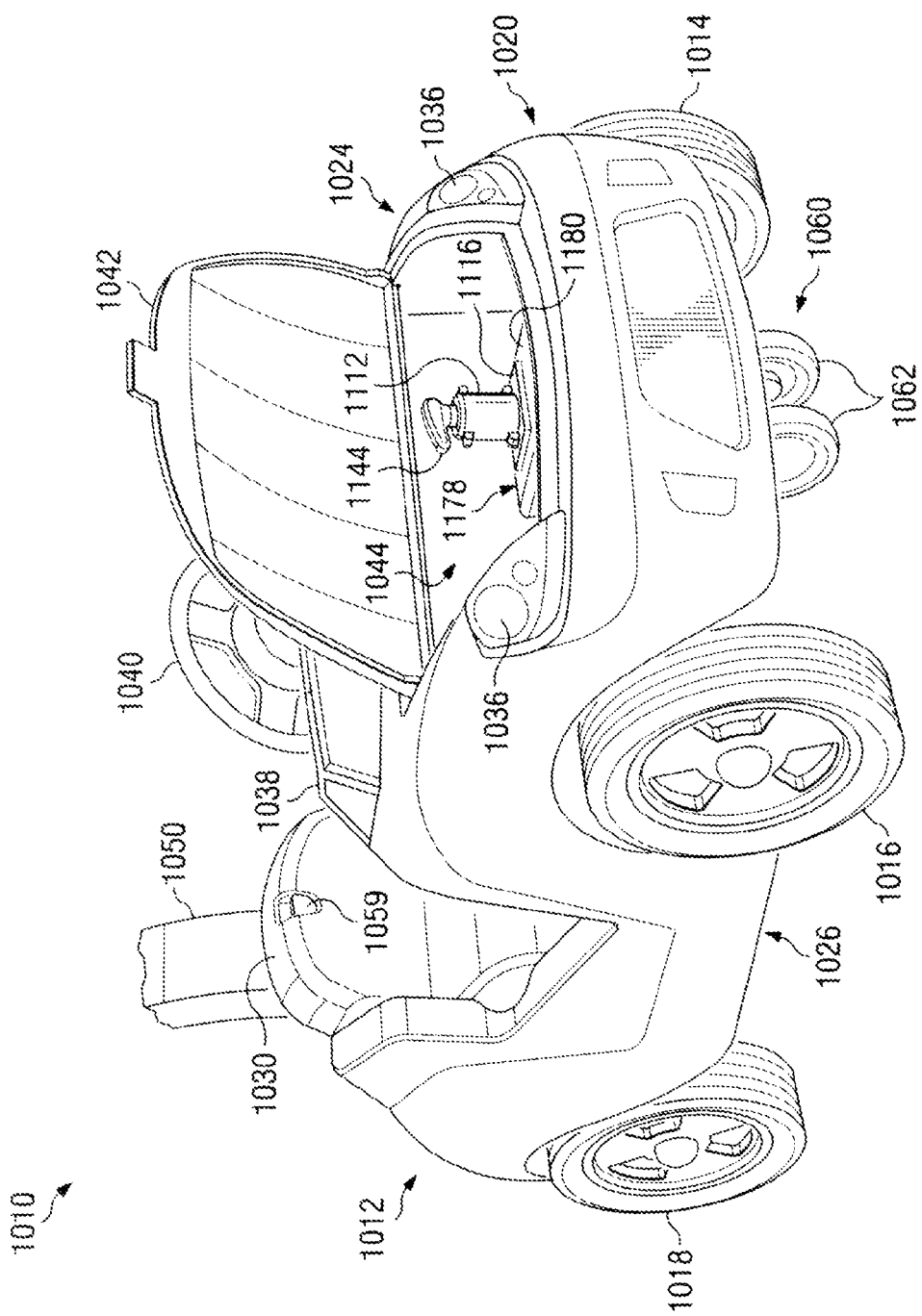
FIG. 8 is a right, front perspective view of the toy vehicle of FIG. 6, with a portion of a rear handle of the toy vehicle omitted, depicting a hood of the toy vehicle in an opened position, and depicting a portion of the caster assembly within an interior compartment of the toy vehicle.

Referring to FIGS. 9, 10, 11A and 11B, the toy vehicle 1010 can include a caster assembly 1058. Caster assembly 1058 can include a swivel-type caster 1060 and an actuator assembly 1100. The actuator assembly 1100 can couple the swivel-type caster 1060 with the body 1012 of the toy vehicle. In one embodiment, the actuator assembly 1100 can couple the swivel-type caster 1060 with the front end portion 1020 of body 1012, as shown in FIGS. 7A, 7B and 8. A body can comprise a unibody type structure as shown in FIGS. 6-8 and 13 with regard to body 1012, but it will be appreciated that a body can alternatively include several different components attached together, such as body panels and a frame. The swivel-type caster 1060 can be positioned laterally between the left front wheel 1014 and the right front wheel 1016. In one embodiment, the swivel-type caster 1060 can be positioned laterally midway between the left front wheel 1014 and the right front wheel 1016. The actuator assembly 1100 can include a guide 1102, a plunger 1104, a sleeve 1106 and a resilient member 1108. The guide 1102 can be secured to the front end portion 1020 of body 1012, and can define a passage, indicated generally at 1110 in FIG. 9. The plunger 1104 can extend through the passage 1110 defined by the guide 1102 and can be movable vertically within the guide 1102, relative to the guide 1102 and the body 1012 of the toy vehicle 1010. The plunger 1104 can be movable vertically between an upper position (FIGS. 7A and 11A) and a lower position (FIGS. 7B and 11B), and can be coupled with the swivel-type caster 1060 such that the swivel-type caster 1060 is movable vertically with the plunger 1104. The upper position of the plunger 1104 can correspond with a raised position (FIG. 7A) of the swivel-type caster 1060, and the lower position of the plunger 1104 can correspond with a lowered position (FIG. 7B) of the swivel-type caster 1060.

Figure 9:
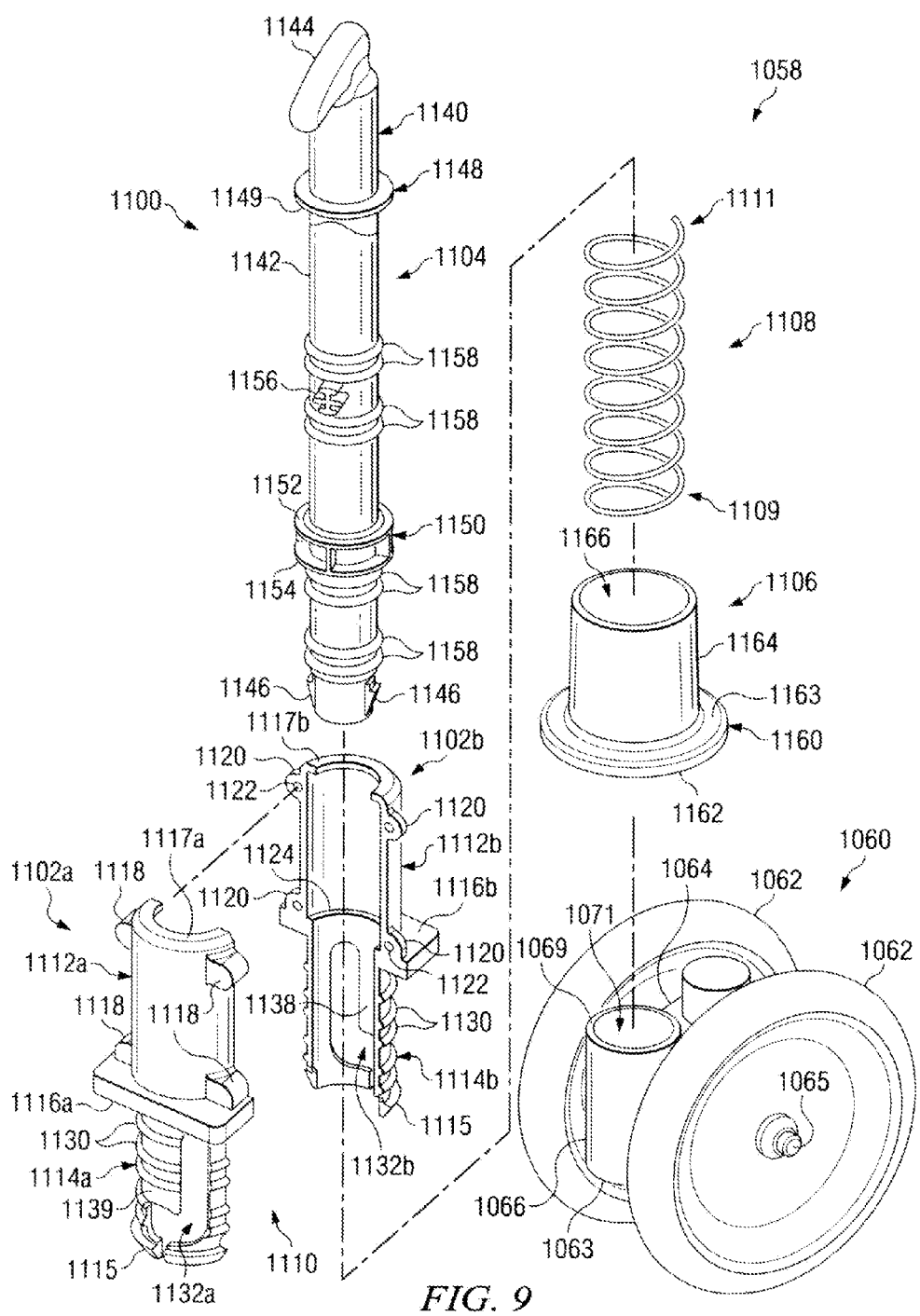
FIG. 9 is an enlarged, exploded perspective view of the caster assembly of the toy vehicle of FIG. 6.
Figure 11A:
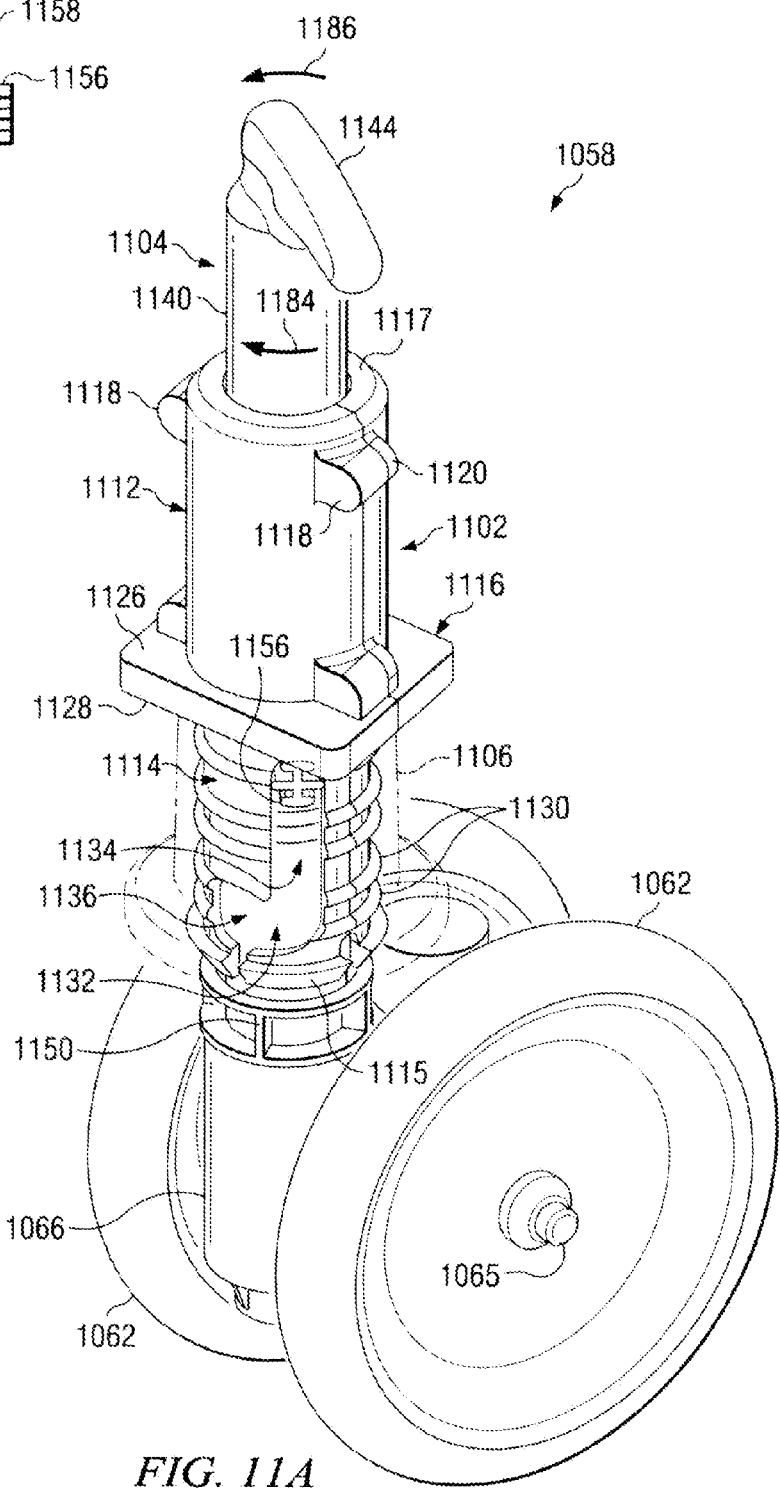
FIG. 11A is an enlarged, perspective view of the caster assembly of the toy vehicle of FIG. 9, apart from the toy vehicle and in an assembled configuration corresponding to the raised position of the swivel-type caster when in use on the toy vehicle of FIG. 6.
Figure 11B:
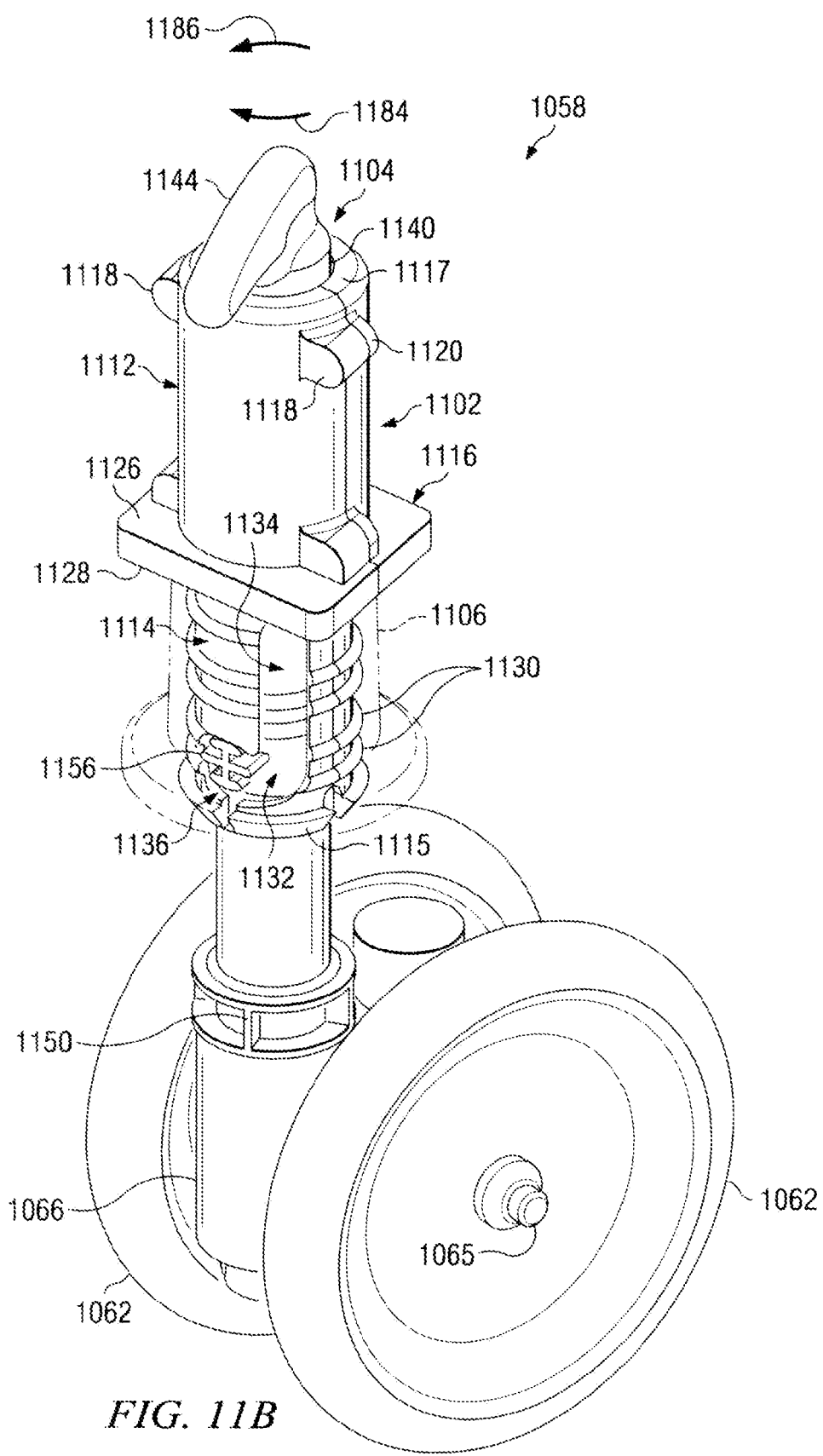
FIG. 11B is an enlarged perspective view similar to FIG. 11A, but with the caster assembly being depicted in an assembled configuration corresponding to the lowered position of the swivel-type caster when in use on the toy vehicle of FIG. 6.

The guide 1102 can include an upper portion 1112, a lower portion 1114, and an intermediate flange 1116 that can be integral with each of the upper portion 1112 and the lower portion 1114, as shown in FIGS. 9, 11A and 11B. In one embodiment, the guide 1102 can include a first half 1102a and a second half 1102b, as shown in FIG. 9, which can be secured to one another. The first half 1102a of guide 1102 can include a first half 1116a of the intermediate flange 1116, and the second half 1102b of the guide 1102 can include a second half 1116a of the intermediate flange 1116. In one embodiment, an upper portion 1112a of the first half 1102a can include a plurality of lugs 1118 and an upper portion 1112b of the second half 1102b of the guide 1102 can include a plurality of ears 1120, of a like number as the number of lugs 1118. Each lug 1118 can include a pin (not shown) and each ear 1120 can define an aperture 1122. Each lug 1118 can be aligned with a respective one of the ears 1120 such that the pin of each lug 1118 can be received within the aperture 1122 of the respective one of the ears 1120 to secure the first half 1102a of the guide 1102 to the second half 1102b of the guide 1102. In other embodiments, guides can be provided that include two halves secured to one another in any other suitable manner.

The upper portion 1112 of guide 1102 and the lower portion 1114 of guide 1102 can cooperate to define an annular shoulder 1124. A portion of the annular shoulder 1124 defined by the upper portion 1112b and the lower portion 1114b of the second half 1102b of the guide 1102 is shown in FIG. 9. The intermediate flange 1116 of the guide 1102 can include an upper surface 1126 and a lower surface 1128 (FIGS. 11A and 11B). The lower portion 1114 of the guide 1102 can include a plurality of outer, annular rings 1130, which can be longitudinally spaced from one another. The guide 1102 can define a plurality of slots 1132. In one embodiment, a lower portion 1114a of the first half 1102a of the guide 1102 can define a first slot 1132a, and a lower portion 1114b of the second half 1102b of the guide 1102 can define a second slot 1132b, as shown in FIG. 9. Each of the slots 1132a, 1132b can include a vertical portion 1134 and a generally horizontal portion 1136 that can communicate with the vertical portion 1134, as shown in FIGS. 11A and 11B with respect to one of the slots 1132. The lower portion 1114 of guide 1102 can include an inside surface 1138, as shown with respect to the lower portion 1114b of the second half 1102b of guide 1102 in FIG. 9. The lower portion 1114 of guide 1102 can also include an outside surface 1139, as shown with respect to the lower portion 1114a of the first half 1102a of guide 1102. Guide 1102 can also include a plurality of distal tabs 1115, which can be circumferentially spaced (FIG. 9).

Figure 10:
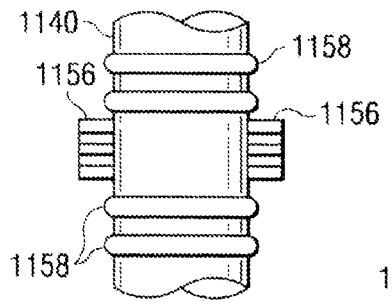
FIG. 10 is a fragmentary elevation view of a portion of a plunger of an actuator assembly of the caster assembly depicted in FIG. 9.

The plunger 1104 can include a stem 1140, having an outer surface 1142. The stem 1140 can be vertically disposed. The plunger 1104 can also include a proximal handle 1144, which can be integral with the stem 1140 and can extend transversely to the stem 1140, as shown in FIG. 9. The plunger 1104 can also include a plurality of distal tabs 1146, which can extend outwardly from the outer surface 1142 of stem 1140. In one embodiment, each of the distal tabs 1146 can be generally wedge-shaped, as shown in FIG. 9. The plunger 1104 can also include an upper, annular flange 1148, which can surround, and can be secured to, the outer surface 1142 of stem 1140. The plunger 1104 can also include a lower, annular member 1150, which can surround, and can be secured to, the outer surface 1142 of stem 1140. The lower annular member 1150 can have an upper surface 1152 and a lower surface 1154 and can be positioned proximal of the distal tabs 1146. The plunger 1104 can also include a plurality of pins 1156 which can extend outwardly from the outer surface 1142 of the stem 1140. In one embodiment, the plunger 1104 can include a pair of pins 1156, as shown in FIG. 10.

The plunger 1104 can also include a plurality of rings 1158, which can surround, and can be integrally formed with secured to, the outer surface 1142 of stem 1140. In one embodiment, the plunger 1104 can include a first plurality of rings 1158 positioned adjacent to, and proximal of, the pins 1156, and can include a second plurality of the rings 1158 positioned adjacent to, and distal of, the pins 1156. The plunger 1104 can also include a third plurality of the rings 1158 positioned adjacent to, and distal of, the lower annular member 1150, and can further include a fourth plurality of the rings 1158 positioned adjacent to, and proximal of, the distal tabs 1146.

The resilient member 1108 can be a spring, and, in one embodiment, can be a coil spring as shown in FIG. 9. The resilient member 1108 can include a lower end 1109 and an upper end 1111. The sleeve 1106 can include a lower, annular flange 1160, which can have a lower surface 1162 and an upper surface 1163. The sleeve 1106 can also include a cylindrical member 1164 which can be integral with the lower, annular flange 1160 and can define an interior opening 1166. The swivel-type caster 1060 can include a pair of rotatable wheels 1062 and a cross-member 1064. The swivel-type caster 1060 can also include an axle 1065 which can extend through the cross-member 1064. Each of the rotatable wheels 1062 can be supported by the axle 1065. The swivel-type caster 1060 can also include a bushing 1066, which can be secured to the cross-member 1064. The bushing 1066 can include an inside surface 1061 (FIG. 12), a lower surface 1063 and an upper surface 1069, and can define an opening 1071.

The front end portion 1020 of body 1012 of the toy vehicle 1010 can include a caster assembly support structure 1174 (FIGS. 7A and 7B). The caster assembly support structure 1174 can include a lower surface 1176 and an upper platform 1178, which can include an upper surface 1180 (FIG. 8). The upper surface 1180 can include a recessed portion (not shown). The upper platform 1178 can be positioned within the interior compartment 1044 defined by the front end portion 1020 of body 1012. The caster assembly support structure 1174 can define an aperture 1182, which can extend vertically through the caster assembly support structure 1174, opening onto each of the lower surface 1176 of the caster assembly support structure 1174 and the upper surface 1180 of the upper platform 1178.

Components of the caster assembly 1058 can be assembled to one another, and the caster assembly 1058 can be secured to the front end portion 1020 of body 1012, using any suitable assembly process, including any suitable sequence of portions of the process. Providing the guide 1102 in the two halves 1102a and 1102b can facilitate the assembly process. In one embodiment, the plunger 1104 can be inserted through the resilient member 1108 such that the resilient member 1108 is disposed in surrounding relationship with the plunger 1104. The resilient member 1108 can be positioned longitudinally along the plunger 1104 such that the upper end 1111 of the resilient member 1108 contacts a lower surface 1149 of the upper, annular flange 1148 of the plunger 1104. One of the first half 1102a and the second half 1102b of guide 1102 can be placed around the resilient member 1108 such that the lower end 1109 of the resilient member 1108 contacts, or rests upon, the annular shoulder 1124 defined by the guide 1102.

The pins 1156 of the plunger 1104 can be distal of the resilient member 1108, and one of the pins 1156 can be positioned within one of the slots 1132a and 1132b. The first half 1102a of the guide 1102 can be secured to the second half 1102b of the guide 1102 by inserting the pins (not shown) of the lugs 1118 of the first half 1102a into the apertures 1122 defined by the ears 1120 of the second half 1102b. When the first half 1102a is secured to the second half 1102b, the other one of the pins 1156 can be positioned within the other one of the slots 1132a, 1132b. In one embodiment, each pin 1156 can extend through, and outwardly of, the respective slot 1132a, 1132b. The first half 1102a of guide 1102 can include a first half 1117a (FIG. 9) of an upper, annular flange 1117 (FIGS. 11A and 11B), and the second half 1102b of the guide 1102 can include a second half 1117b of the upper, annular flange 1117.

The upper, annular flange 1148 of plunger 1104 can be positioned within the passage 1110 defined by the guide 1102 below the upper, annular flange 1117 of guide 1102. The upper, annular flange 1148 has an outside diameter which can be greater than an inside diameter of the upper, annular flange 1117 of the guide 1102, such that the upper, annular flange 1117 can limit the upward movement of the plunger 1104. Contact between the upper, annular flange 1148 of plunger 1104 and the upper, annular flange 1117 of guide 1102 can establish the upper position of the plunger 1104. The upper end 1111 of the resilient member 1108 can engage the lower surface 1149 of the upper, annular flange 1148 of plunger 1104, such that when the plunger 1104 is pushed downwardly, the resilient member 1108 can exert an upward force on the upper, annular flange 1148 which can bias the plunger 1104 toward an upper position, for example, as shown in FIGS. 7A and 11A.

The guide 1102 can be inserted into the aperture 1182, from a position above the upper platform 1178, such that the lower portion 1114 of guide 1102 extends through the caster assembly support structure 1174, with the distal tabs 1115 of the lower portion 1114 of guide 1102 extending below the lower surface 1176 of the caster assembly support structure 1174 and with the intermediate flange 1116 of guide 1102 in contact with the upper surface 1180 of the upper platform 1178 as shown in FIG. 8, such that the intermediate flange 1116 is supported by the upper platform 1178. In one embodiment, the intermediate flange 1116 can contact the recessed portion of the upper surface 1180 of the upper platform 1178. The plunger 1104 can extend below the guide 1102. For example, the lower annular member 1150 of the plunger 1104 can be positioned below the distal tabs 1115 of the guide 1102.

The sleeve 1106 can be secured to the guide 1102 and to the caster assembly support structure 1174. The cylindrical portion 1164 of the sleeve 1106 can be inserted into the aperture 1182 defined by the caster assembly support structure 1174, in surrounding relationship with the lower portion 1114 of guide 1102. The upper surface 1163 of the annular flange 1160 of sleeve 1106 can be positioned in contacting engagement with the lower surface 1176 of the caster assembly support structure 1174. The guide 1102 and sleeve 1106 can be sized and configured such that the distal tabs 1115 of the lower portion 1114 of guide 1102 can engage the lower surface 1162 of the annular flange 1160 of sleeve 1106, which can be a snap fit engagement. The engagement of the distal tabs 1115 of the lower portion 1114 of guide 1102 with the lower surface 1162 of the annular flange 1160 of sleeve 1106, in combination with the intermediate flange 1116 of the guide 1102 being supported by the upper platform 1178 of the caster assembly support structure 1174, can secure the guide 1102 and the sleeve 1106 to one another and can couple (in a fixed vertical position) each of the guide 1102 and sleeve 1106 with the front end portion 1020 of body 1012.

Figure 12:
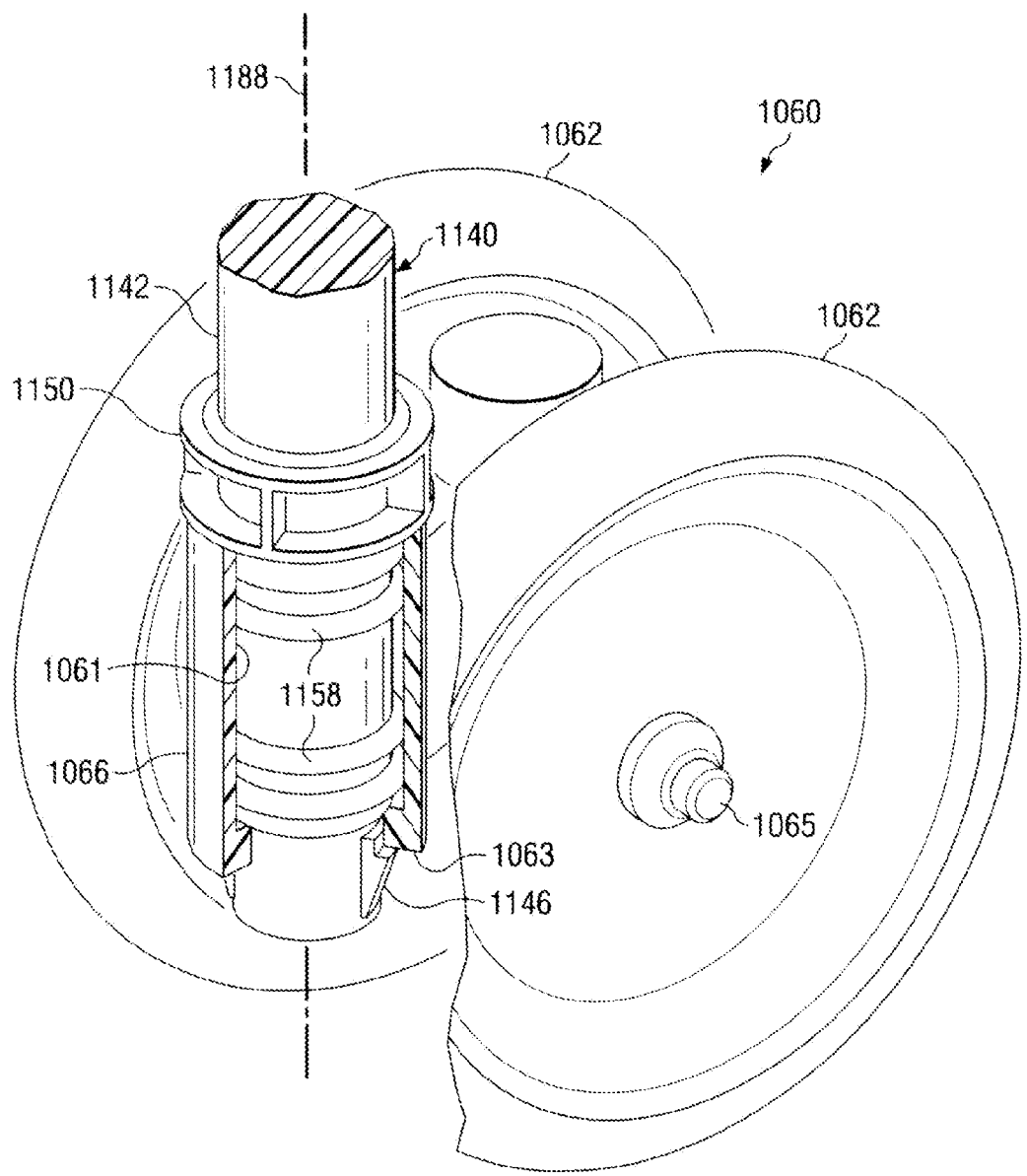
FIG. 12 is a fragmentary perspective view, partially in cross-section, of a portion of the caster assembly of FIG. 9, in an assembled configuration.

The plunger 1104 can be inserted through the bushing 1066 of the swivel-type caster 1060, and the distal tabs 1146 of plunger 1104 can engage the lower surface 1063 of the bushing 1066, as shown in FIG. 12, which can couple the plunger 1104 to the swivel-type caster 1060. The distal tabs 1146 can engage the bushing 1060 in a snap fit, which can be facilitated by the shape of the distal tabs 1146, which can be generally wedge-shaped. As a result of coupling the plunger 1104 with the swivel-type caster 1060, the swivel-type caster 1060 can move vertically with the plunger 1104 between the raised position shown in FIG. 7A and the lowered position shown in FIG. 7B. The upper position of the plunger 1104, shown in FIG. 7A, can correspond with the raised position of the swivel-type caster 1060, and the lower position of the plunger 1104 shown in FIG. 7B can correspond with the lowered position of the swivel-type caster 1060. When the swivel-type caster 1060 is in the raised position, each of the left front wheel 1014, the right front wheel 1016, the left rear wheel 1017 and the right rear wheel 1018 can be positioned in contact with, or can rest upon, a flat support surface (e.g., 1090). In the raised position, the rotatable wheels 1062 of the swivel-type caster 1060 can be spaced from the flat support surface (e.g., 1090). When the swivel-type caster 1060 is in the lowered position, each of the rotatable wheels 1062 and each of the left rear wheel 1017 and the right rear wheel 1018 can engage a flat support surface (e.g., 1090) and each of the left front wheel 1014 and the right front wheel 1016 can be spaced from a flat support surface (e.g., 1090).

When an operator of the toy vehicle 10 wishes to move the swivel-type caster 1060 from the raised position to the lowered position, the operator can grasp the proximal handle 1144 of the plunger 1104 and can push the plunger 1104 downwardly. As a result, each of the pins 1156 of the plunger 1104 can be positioned at a lower end of the vertical portion 1134 of the respective one of the slots 1132a, 1132b, adjacent to the horizontal portion 1136 of the respective one of the slots 1132a, 1132b. The operator can then rotate the handle 1144 of the plunger 1104, for example in direction 1184 shown in FIGS. 11A and 11B, which can result in each of the pins 1156 moving into the horizontal portion 1136 of the respective one of the slots 1132a, 1132b, which can selectively and releasably lock the plunger 1104 in the lower position and can selectively and releasably lock the swivel-type caster 1060 in the lowered position. The plunger 1104 can rotate about a vertical axis 1188 (FIG. 12) extending through the stem 1140, and the swivel-type caster 1060 can swivel about the axis 1188. When the operator wishes to unlock the swivel-type caster 1060, the operator can rotate the handle 1144 of the plunger 1104 in an opposite direction, for example in direction 1186 shown in FIGS. 11A and 11B, which can result in the pins 1156 moving out of the horizontal portion 1136 into the vertical portion 1134 of the respective slot 1132a, 1132b, such that the pins 1156 are free to move upwardly within the vertical portion 1134 of the respective slot 1132a, 1132b, which permits the swivel-type caster 1060 to move upwardly to the raised position. The resilient member 1108 can bias the plunger 1104 upwardly, which can bias the swivel-type caster 1060 toward the raised position.

Figure 14:
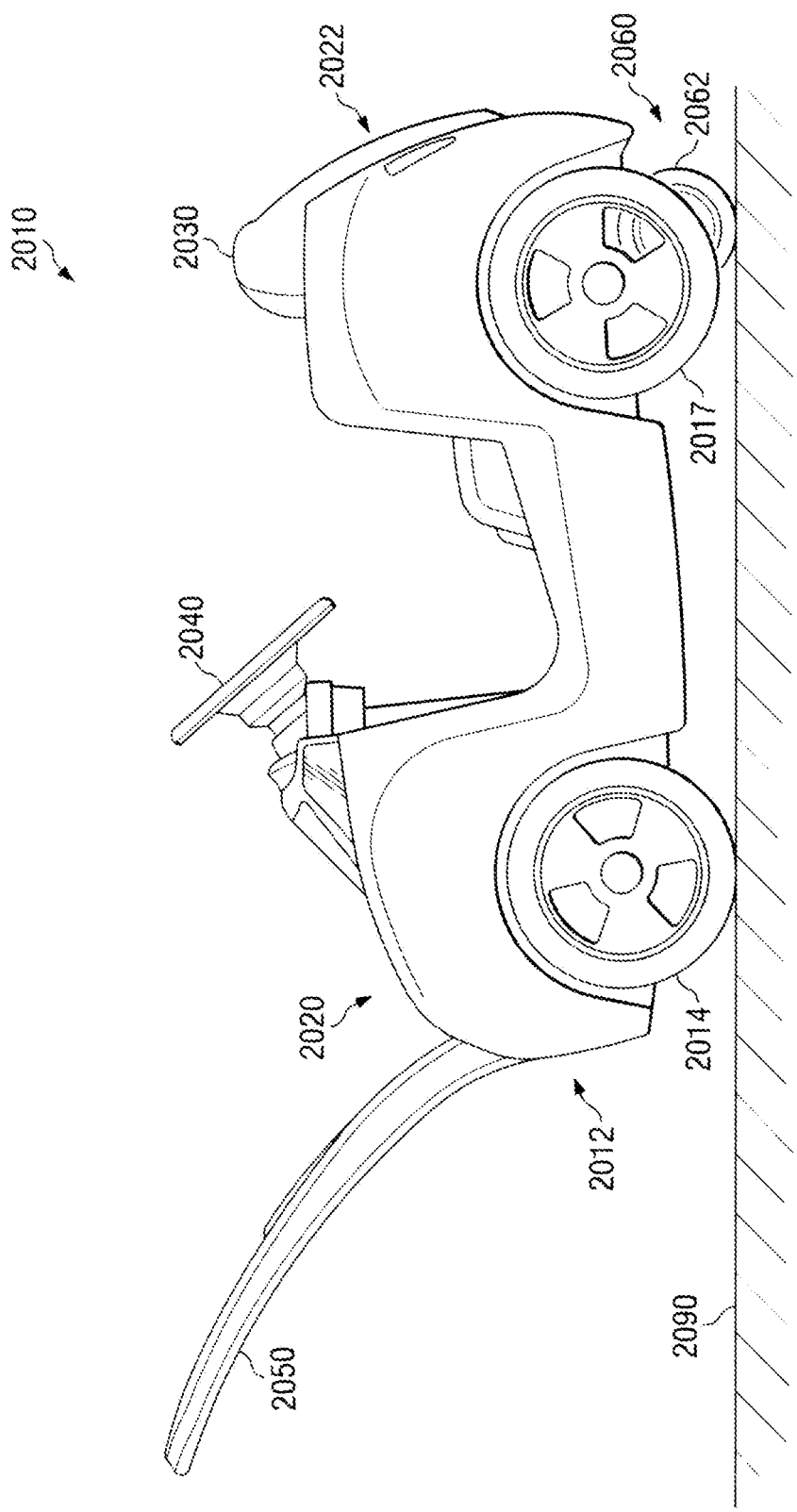
FIG. 14 is a left side elevational view of a toy vehicle according to another embodiment.
Figure 15:
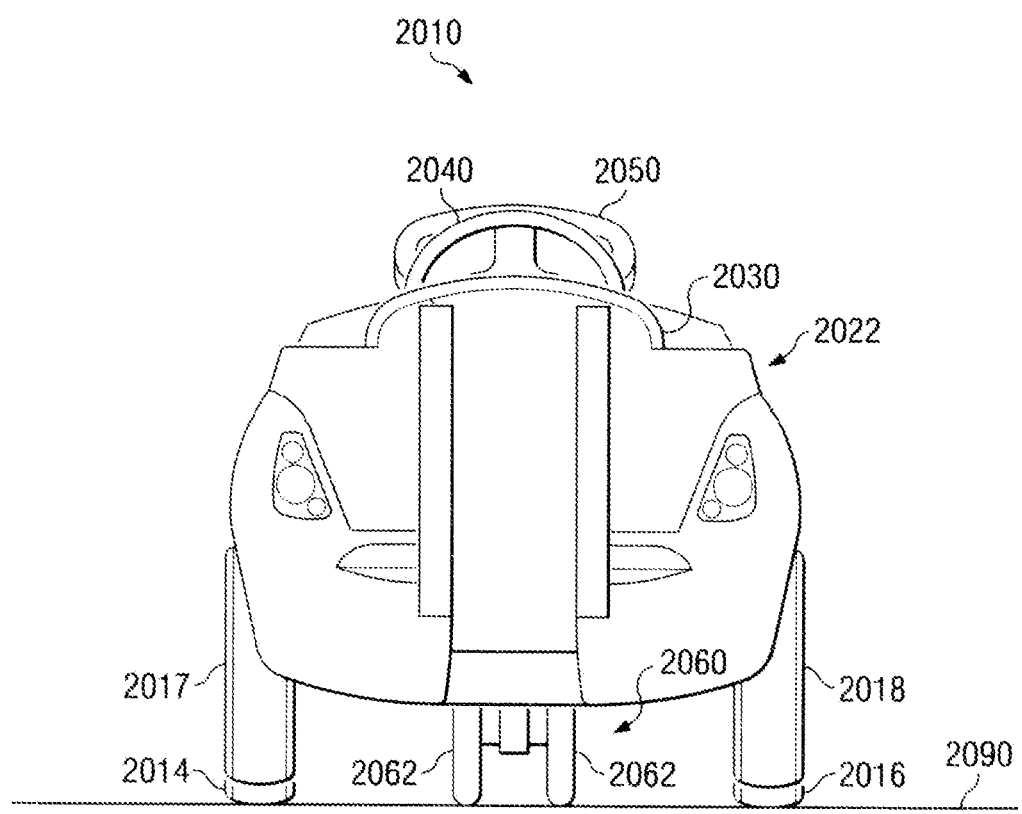
FIG. 15 is a rear elevational view of the toy vehicle of FIG. 14.

FIGS. 14 and 15 depict a toy vehicle 2010 according to another embodiment. The toy vehicle 2010 can include a body 2012, which can have a front end portion 2020 and a rear end portion 2022. The toy vehicle 2010 can also include a left front wheel 2014, a right front wheel 2016, a left rear wheel 2017, and a right rear wheel 2018, each of which can be coupled with the body 2012 such that they are rotatable relative to the body 2012, but are in capable of swiveling relative to the body 2012. The body 2012 can also include a seat 2030. The toy vehicle 2010 can also include a steering wheel 2040 and a handle 2050. In one embodiment, the steering wheel 2040 can be fixed relative to the body 2012, and in another embodiment, the steering wheel 2040 can be rotatable relative to the body 2012. In either embodiment, the steering wheel 2040 can be uncoupled with the left front wheel 2014 and the right front wheel 2010, since they are incapable of swiveling relative to body 2012 and are therefore not steerable. The toy vehicle 2010 can also include a swivel-type caster 2060, which can include a pair of rotatable wheels 2062. As shown in FIG. 14, the swivel-type caster 2060 can be coupled with the rear end portion 2022 of the body 2012 and the handle 2050 can be coupled with the front end portion 2020 of the body 2012 of the toy vehicle 2010. The swivel-type caster 2060 can be movable vertically relative to the body 2012, between a raised position (not shown) and a lowered position, shown in FIGS. 14 and 15. When the swivel-type caster 2060 is in the lowered position, each of the left front wheel 2014, the right front wheel 2016 and each of the rotatable wheels 2062 can engage, or rest upon, a flat support surface (e.g., 2090) and each of the left rear wheel 2017 and the right rear wheel 2018 can be spaced from a flat support surface (e.g., 2090). When the swivel-type caster 2060 is in the raised position, each of the left front wheel 2014, the right front wheel 2016, the left rear wheel 2017 and the right rear wheel 2018 can engage, or rest upon, a flat support surface (e.g., 2090) and each of the rotatable wheels 2062 can be spaced from a flat support surface (e.g., 2090).

The use of a caster assembly that includes a swivel-type caster with a toy vehicle (e.g., 10, 1010, 2010) can facilitate the convenient maneuverability of the respective toy vehicle, i.e., when the swivel-type caster is in contacting engagement with a flat support surface upon which the toy vehicle rests, and the longitudinally adjacent ones of the front and rear wheels of the toy vehicle are spaced from the flat support surface. In embodiments that include a swivel-type caster that can be moved vertically between lowered and raised positions, the swivel-type caster can facilitate the effective use of a toy vehicle on multiple types of support surfaces. For example, positioning the swivel-type caster in a lowered position can facilitate use of the toy vehicle on a flat or planar surface, for example a sidewalk, or various surfaces within a home, store, etc., wherein the swivel-type caster is in contacting engagement with the surface and the longitudinally adjacent ones of the front and rear wheels of the toy vehicle are spaced from the flat support surface. However, the longitudinally adjacent ones of the front and rear wheels, which are spaced from the flat support surface, can enhance the stability of the toy vehicle during turning. Positioning the swivel-type caster in a raised position can facilitate use of the toy vehicle on a rough, uneven support surface, with the swivel-type caster spaced from the support surface and with the front and rear wheels of the toy vehicle contacting the support surface. Furthermore, use of swivel-type casters can facilitate an easily steerable vehicle having a body (e.g., 12, 1012, 2012) of the respective toy vehicle (e.g., 10, 1010, 2010) more closely resembling an automobile, for example, since the respective left front wheel (e.g., 14, 1014, 2014) and the respective right front wheel (e.g., 16, 1016, 2016) are in place even though they are not steerable.

Positioning the upper grasping portion 78 of the knob 76 of the caster assembly 58 within the interior compartment 44 of toy vehicle 10, which can be accessed by opening hood 42, can provide easy access to the upper grasping portion 78 of the knob 76 for an operator to raise and lower the swivel-type caster 60 as desired. Similarly, positioning the proximal handle 1144 of the plunger 1104 of the actuator assembly 1100 of the caster assembly 1058 within the interior compartment 1044 of toy vehicle 1010, which can be accessed by opening hood 1042, can provide easy access to handle 1144 for an operator to raise and lower the swivel-type caster 1060 as desired. The configuration of the actuator assembly 1100 permits an operator to conveniently lock the swivel-type caster 1060 in the lowered position when desired, and to conveniently unlock the swivel-type caster 1060 when desired to permit moving the swivel-type caster 1060 to the raised position. The handle 1144, together with the upper portion 1112 and intermediate flange 1116 of the guide 1102 of the actuator assembly 1058, which can be positioned within the interior compartment 1044 and can be seen when the hood 1042 is in the opened position, can resemble a jack of the kind that can be used to facilitate changing a tire on an automobile.

While swivel-type casters (e.g., 60, 160, 260, 1060, 2060) have been depicted for use with toy vehicles configured as convertible automobiles, it will be appreciated that swivel-type casters (e.g., 60, 160, 260, 1060, 2060) can be used with toy vehicles having any of a wide variety of other configurations, such as toy automobiles having other configurations, toy trucks, toy train locomotives or train cars, or toy airplanes, for example. Furthermore, the body of the respective toy vehicle (e.g., 10, 1010, 2010) can be formed from a variety of colored plastics and can include a variety of decorations, such as decals, applied to the plastic material, or alternatively can be formed from another material such as metal.

While various embodiments of a toy vehicle have been illustrated by the foregoing description and have been described in considerable detail, it is not intended to restrict or in any way limit the scope of the appended claims to such detail. Additional modifications will be readily apparent to those skilled in the art.

What is claimed is:
1. A toy vehicle comprising:
a body comprising a front end portion and a rear end portion;
a left front wheel and a right front wheel, each of the left front wheel and the right front wheel being coupled with the front end portion of the body and rotatable relative to the body;
a left rear wheel and a right rear wheel, each of the left rear wheel and the right rear wheel being coupled with the rear end portion of the body and rotatable relative to the body; and
a caster assembly comprising a swivel-type caster, a rod coupled with the swivel-type caster, and a knob threadedly engaged with the rod; wherein
the swivel-type caster comprises at least one rotatable wheel;
the swivel-type caster is swivelable relative to the body and is movable vertically relative to the body between a raised position and a lowered position;
the swivel-type caster is coupled with the front end portion of the body, such that the swivel-type caster is positioned laterally between the left front wheel and the right front wheel;
the rod and the knob cooperate to couple the swivel-type caster with the front end portion of the body; and
the knob is configured to move the swivel-type caster vertically.

2. The toy vehicle of claim 1, wherein:
the front end portion of the body comprises a lower mount structure comprising an upper surface and a lower surface and defining an aperture extending through each of the upper surface and the lower surface;
the knob comprises an upper grasping portion and a generally cylindrical portion integral with the upper grasping portion, the upper grasping portion in contacting engagement with the upper surface of the lower mount structure of the front end portion of the body when the swivel-type caster is in each of the raised position and the lowered position, the generally cylindrical portion extending downwardly into the aperture defined by the lower mount structure;
the swivel-type caster further comprises a bushing integral with the cross-member; and
the rod comprises an upper, threaded portion threadedly engaged with the generally cylindrical portion of the knob, a lower, portion received within the bushing, and a generally vertical axis of rotation, the lower portion of the rod and the bushing of the swivel-type caster cooperating to permit the swivel-type caster to swivel relative to the body about the generally vertical axis.

3. A toy vehicle comprising:
a body comprising a front end portion and a rear end portion;
a left front wheel and a right front wheel, each of the left front wheel and the right front wheel being coupled with the front end portion of the body and rotatable relative to the body;
a left rear wheel and a right rear wheel, each of the left rear wheel and the right rear wheel being coupled with the rear end portion of the body and rotatable relative to the body; and
a caster assembly comprising a swivel-type caster and an actuator assembly, the swivel-type caster comprising at least one rotatable wheel; wherein
the swivel-type caster is swivelable relative to the body and is movable vertically relative to the body between a raised position and a lowered position; and the swivel-type caster is coupled with the front end portion of the body, such that the swivel-type caster is positioned laterally between the left front wheel and the right front wheel;

the actuator assembly comprises a guide secured to the front end portion of the body and a plunger movable vertically within the guide between an upper position and a lower position;

the plunger is coupled with the swivel-type caster such that the swivel-type caster is movable vertically with the plunger; and the upper position of the plunger corresponds with the raised position of the swivel-type caster and the lower position of the plunger corresponds with the lowered position of the swivel-type caster.

4. The toy vehicle of claim 3, further comprising:
a handle; wherein
the handle is coupled with the rear end portion of the body.

5. The toy vehicle of claim 4, wherein:
the swivel-type caster further comprises a cross-member; and
the at least one rotatable wheel of the swivel-type caster comprises a pair of rotatable wheels, each of the pair of rotatable wheels being rotatably coupled with the cross-member, and first and second ones of the pair of rotatable wheels being laterally spaced from one another.

6. The toy vehicle of claim 3, wherein:
the actuator assembly further comprises a resilient member; and
the resilient member biases the plunger toward the upper position.

7. The toy vehicle of claim 6, wherein:
the plunger is selectively and releasably lockable in the lower position.

8. A toy vehicle comprising:
a body comprising a front end portion and a rear end portion;
a left front wheel, a right front wheel, a left rear wheel, and a right rear wheel, each of the left front wheel, the right front wheel, the left rear wheel and the right rear wheel being coupled with the body and rotatable relative to the body; and
a caster assembly comprising a swivel-type caster coupled with the front end portion of the body such that the swivel-type caster is swivelable relative to the body and is movable vertically relative to the body between a raised position and a lowered position, the swivel-type caster comprising at least one rotatable wheel;
a handle coupled with the rear end portion of the body; and
a hood pivotally coupled with the front end portion of the body, the hood being pivotable between an opened position and a closed position; wherein the front end portion of the body defines an interior compartment, a portion of the caster assembly being positioned within the interior compartment to facilitate access to the caster assembly;
when the swivel-type caster is in the raised position, each of the left front wheel, the right front wheel, the left rear wheel, and the right rear wheel is configured to rest upon a flat support surface such that the at least one rotatable wheel of the swivel-type caster is spaced from the flat support surface;
when the swivel-type caster is in the lowered position, the at least one rotatable wheel of the swivel-type caster and each of the left rear wheel and the right wheel are configured to rest upon the flat support surface such that each of the left front wheel and the right front wheel is spaced from the flat support surface;

the interior compartment defined by the front end portion of the body is closed when the hood is in the closed position; and the interior compartment is open when the hood is in the opened position, the portion of the caster assembly within the upper compartment being accessible when the hood is in the opened position.

9. The toy vehicle of claim 8, wherein:
the body of the toy vehicle is configured to resemble a body of an automobile; and
the body comprises a seat sized and configured to support a child.

10. A toy vehicle comprising:
a body comprising a front end portion and a rear end portion;
a left front wheel and a right front wheel, each of the left front wheel and the right front wheel being coupled with the body and rotatable relative to the body;
a left rear wheel and a right rear wheel, each of the left rear wheel and the right rear wheel being coupled with the body and rotatable relative to the body;
a caster assembly comprising a swivel-type caster and an actuator assembly, the swivel-type caster comprising at least one rotatable wheel, the actuator assembly comprising a guide and a plunger, the guide being secured to the front end portion of the body and defining a passage, the plunger being movable vertically within the passage relative to the guide and the front end portion of the body; wherein
the plunger is coupled with the swivel-type caster such that the swivel-type caster is swivelable relative to the body and is movable vertically with the plunger relative to the front end portion of the body between a raised position and a lowered position.

11. The toy vehicle of claim 10, wherein:
the swivel-type caster further comprises a bushing secured to the plunger; and
the plunger is movable vertically between an upper position and a lower position, the upper position of the plunger corresponding with the raised position of the swivel-type caster, the lower position of the plunger corresponding with the lowered position of the swivel-type caster.

12. The toy vehicle of claim 11, wherein:
the bushing comprises an upper surface and a lower surface and defines an opening;
the plunger comprises at least one distal tab; and
the plunger extends through the opening defined by the bushing such that the at least one distal tab of the plunger engages the lower surface of the bushing.

13. The toy vehicle of claim 12, wherein:
the plunger further comprises a lower annular member positioned proximal of the at least one distal tab, the lower annular member being engaged with the upper surface of the bushing.

14. The toy vehicle of claim 11, wherein:
the plunger is biased toward the upper position and is selectively and releasably lockable in the lower position such that the swivel-type caster is selectively and releasably lockable in the lowered position.

15. The toy vehicle of claim 14, wherein:
the actuator assembly further comprises a resilient member comprising a lower end and an upper end;
the guide further defines an annular shoulder;
the plunger further comprises an upper, annular flange;

the resilient member is positioned within the passage defined by the guide in surrounding relationship with the plunger; and the lower end of the resilient member rests upon the annular shoulder and the upper end of the resilient member engages the upper, annular flange of the plunger.

16. The toy vehicle of claim 11, wherein:

the guide comprises an inside surface and an outside surface;

the guide defines at least one slot, the at least one slot extending through each of the inside surface and the outside surface;

the plunger comprises a stem and at least one pin, the stem being vertically disposed and comprising an outer surface, the at least one pin extending outwardly from the outer surface of the stem; and the at least one pin is movable vertically within the at least one slot as the plunger moves vertically between the upper position and the lower position.

17. The toy vehicle of claim 16, wherein:

the at least one slot comprises a vertical portion and a generally horizontal portion communicating with the vertical portion;

the at least one pin is movable within the vertical portion of the at least one slot as the plunger moves vertically between the upper position and the lower position; and when the plunger is in the lower position and the at least one pin is positioned within the vertical portion of the at least one slot and adjacent to the generally horizontal portion of the at least one slot, rotation of the plunger in a first direction moves the at least one pin into the generally horizontal portion of the at least one slot to selectively and releasably lock the plunger in the lower position and to selectively and releasably lock the swivel-type caster in the lowered position.

18. The toy vehicle of claim 11, wherein:

the front end portion of the body comprises a caster assembly support structure comprising an upper platform and a lower surface, the caster assembly support structure defining an aperture;

the guide comprises a plurality of distal tabs and an intermediate flange;

the guide extends through the aperture defined by the caster assembly support structure such that the distal tabs of the guide extend below the lower surface of the caster assembly support structure; and the intermediate flange of the guide is supported by the upper platform of the caster assembly support structure.

19. The toy vehicle of claim 18, wherein:

the actuator assembly further comprises a sleeve;

the sleeve comprises an annular flange comprising a lower surface and an upper surface;

the sleeve further comprises a cylindrical member and defines an opening;

the cylindrical member of the sleeve extends into the aperture defined by the caster assembly support structure, in surrounding relationship with the guide, the guide extending through opening defined by the cylindrical member of the sleeve;

the upper surface of the annular flange of the sleeve contacts the lower surface of the caster assembly support structure; and the distal tabs of the guide engage the lower surface of the annular flange of the sleeve.

* * * * *